(12) United States Patent
Matthews et al.

(10) Patent No.: US 11,831,567 B1
(45) Date of Patent: Nov. 28, 2023

(54) DISTRIBUTED LINK DESCRIPTOR MEMORY

(71) Applicant: Marvell Asia Pte, Ltd., Singapore (SG)

(72) Inventors: William Brad Matthews, Saratoga, CA (US); Puneet Agarwal, Santa Clara, CA (US); Ajit Kumar Jain, Milpitas, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/946,902

(22) Filed: Sep. 16, 2022

(51) Int. Cl.
*H04L 49/901* (2022.01)
*H04L 49/00* (2022.01)
*H04L 49/9047* (2022.01)

(52) U.S. Cl.
CPC ........ *H04L 49/901* (2013.01); *H04L 49/3027* (2013.01); *H04L 49/3063* (2013.01); *H04L 49/9047* (2013.01)

(58) Field of Classification Search
CPC ............... H04L 49/901; H04L 49/3027; H04L 49/3063; H04L 49/9047
See application file for complete search history.

(56) References Cited

U.S. PATENT DOCUMENTS

| 10,884,829 | B1 * | 1/2021 | Issa ..................... G06F 12/0207 |
| 10,938,739 | B1 * | 3/2021 | Jain ........................ H04L 47/786 |
| 11,522,817 | B1 * | 12/2022 | Matthews ........... H04L 43/0882 |
| 2015/0085878 | A1 * | 3/2015 | Kangarlou .......... H04L 49/9047 370/465 |
| 2016/0277544 | A1 * | 9/2016 | Haghighi ............ H04L 41/0226 |

FOREIGN PATENT DOCUMENTS

CN          101926109 B  *  7/2013  ........... H04L 5/0053

\* cited by examiner

*Primary Examiner* — Mounir Moutaouakil
(74) *Attorney, Agent, or Firm* — Shield Intellectual Property PC; Zhichong Gu

(57) ABSTRACT

Link data is stored in a distributed link descriptor memory ("DLDM") including memory instances storing protocol data unit ("PDU") link descriptors ("PLDs") or cell link descriptors ("CLDs"). Responsive to receiving a request for buffering a current transfer data unit ("TDU") in a current PDU, a current PLD is accessed in a first memory instance in the DLDM. It is determined whether any data field designated to store address information in connection with a TDU is currently unoccupied within the current PLD. If no data field designated to store address information in connection with a TDU is currently unoccupied within the current PLD, a current CLD is accessed in a second memory instance in the plurality of memory instances of the same DLDM. Current address information in connection with the current TDU is stored in an address data field within the current CLD.

20 Claims, 13 Drawing Sheets responsive to receiving a request for buffering a current TDU belonging to a current PDU, access a current PLD, for the current PDU, in a first memory instance 1402 determine whether any data field designated to store address information in connection with a TDU is currently unoccupied within the current PLD 1404 if not, access a current CLD in a second memory instance 1406 store current address information in connection with the current TDU in an address data field within the current CLD 1408

FIG. 7

700 PDU Link Descriptor

| 702 Next Pointer | 704 Seq Number | 706-0 Addr 0 | 706-1 Addr 1 | 708-0 Cell Link Addr 0 | 708-1 Cell Link Addr 1 | 710 PDU Metadata |

FIG. 8

800 Cell Link Descriptor

| 802-0 Addr 0 | 802-1 TDU Addr 1 | 802-2 Addr 2 | ... | 802-(N-2) Addr (N-2) | 802-(N-1) Addr (N-1) | 804 Spare Bits | responsive to receiving a request for buffering a current TDU belonging to a current PDU, access a current PLD, for the current PDU, in a first memory instance 1402 determine whether any data field designated to store address information in connection with a TDU is currently unoccupied within the current PLD 1404 if not, access a current CLD in a second memory instance 1406 store current address information in connection with the current TDU in an address data field within the current CLD 1408

FIG. 14

DISTRIBUTED LINK DESCRIPTOR MEMORY

TECHNICAL FIELD

Embodiments relate generally to data buffering, and, more specifically, to buffering data units within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The process of temporarily storing data while the data awaits processing is commonly known as "buffering." In computing devices, including both networking apparatuses and other devices, various components may need to temporarily store data while the data awaits processing. For example, a network switch may receive, from time to time, more data in a given period of time than can be processed by its packet processors. A traffic manager or other component within the switch may therefore regulate the flow of this data to the packet processors by buffering the data until the packet processors are ready to process the data.

Data temporarily stored in this manner is said to be stored in a buffer. A buffer may comprise one or more memory instances in which data may be stored. A memory instance is an independently addressable and accessible unit of memory, such as an on-chip block of memory (e.g. an array of memory cells) or off-chip memory chip. In an embodiment, static random-access memories ("SRAM") may be preferred for speed and/or cost. However, in other embodiments any suitable type of memory may be utilized for a memory instance, including dynamic random-access memories, registers, flash-based memories, and so forth.

A memory instance may be classified based upon its access limitations, in terms of the number of operations that may be performed with respect to the memory instance in a given memory access period, such as a memory clock cycle, edge of a memory clock cycle, set of memory clock cycles, or any other suitable time slot. For instance, a memory instance may be single-ported, in that only one operation is supported in a time slot (either a read operation or a write operation). Or, a memory instance may be multi-ported, in that two, three, or even more operations are supported in a memory access period. In some embodiments, single-ported memories are preferred for cost efficiency, power demands, and/or other reasons. However, in other embodiments, dual-ported or other multi-ported memories may be preferred.

Each memory operation reads from or writes to a specified address in the memory instance. Each address corresponds to a different location within the memory, also referred to as an entry or buffer entry. Each entry is of a fixed size (e.g. a fixed number of bits or bytes), and this size is also known as the "width" of the memory instance. The number of entries within the memory instance is known as the "depth" of the memory instance.

It is generally desirable to optimize the components of a computing device, including the buffers, so that the device quickly determines where to send and/or store data for processing, and to expediently send and/or store that data to the appropriate destination once determined.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 7 illustrates an example protocol data unit (PDU) link descriptor;

FIG. 8 illustrates an example cell link descriptor;

FIG. 14 illustrates an example process flow.

DETAILED DESCRIPTION

Figure 1:
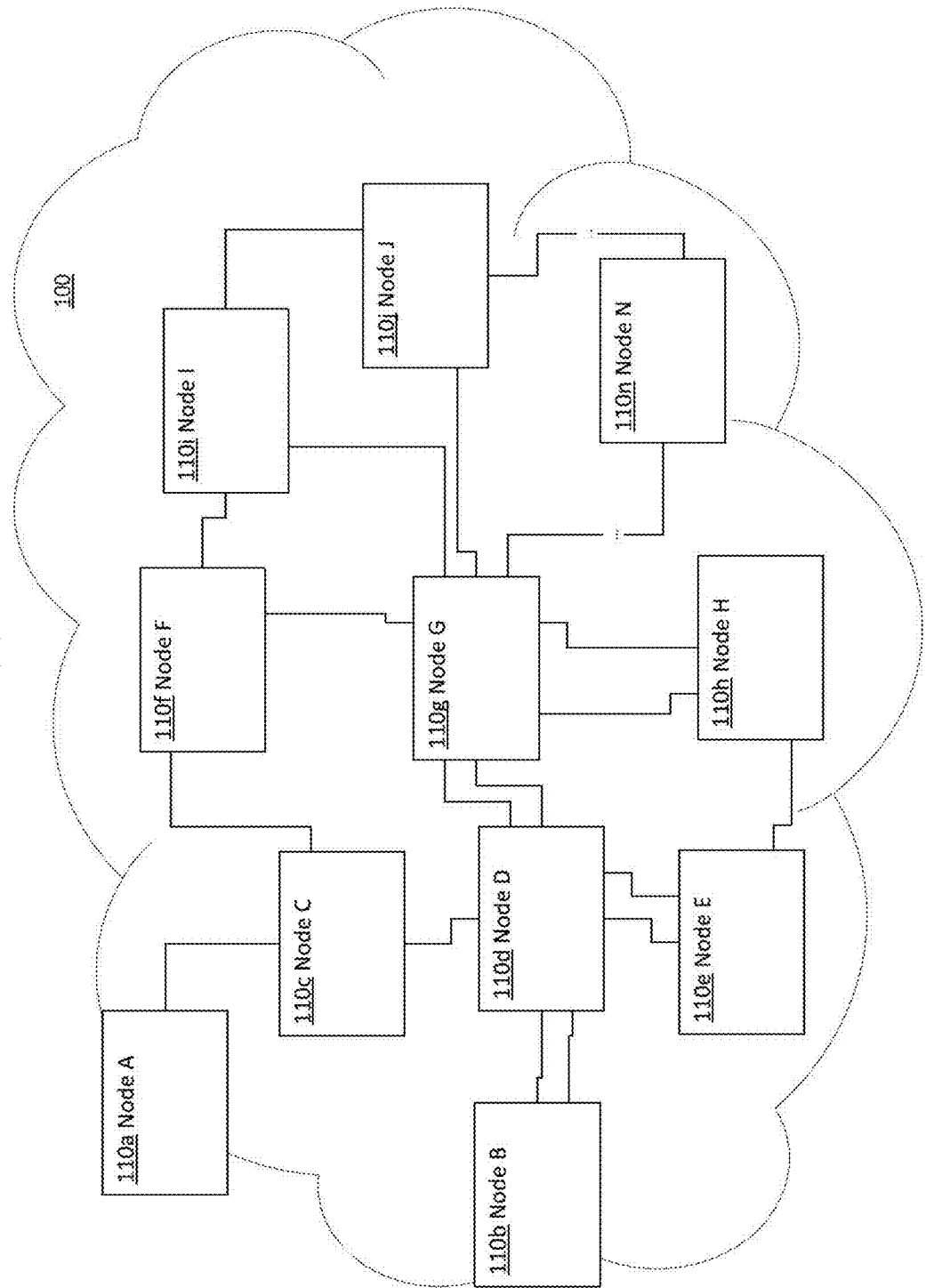
FIG. 1 illustrates example aspects of an example networking system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
    2.0. Structural Overview
    2.1. Data Units
    2.2. Network Paths
    2.3. Network Device
    2.4. Ports
    2.5. Packet Processors
    2.6. Buffers
    2.7. Queues
    2.8. Traffic Management
    2.9. Forwarding Logic
    2.10. Efficient Buffering Mechanisms
    2.11. Miscellaneous
    3.0. Functional Overview
    3.1. Linking TDUs with PLD
    3.2. Linking TDUs with PLD/CLD
    3.3. Linking TDUs with PLD/CLD and TDU Map Memory
    3.4. DLDM Bank or Sub Bank Selection
    4.0. Example Embodiments
    5.0. Implementation Mechanism-Hardware Overview
    6.0. Extensions and Alternatives

1.0. General Overview

Approaches, techniques, and mechanisms are disclosed for improved buffering of data units within network devices and other computing devices to support relatively high individual and aggregated linking rates corresponding to terabits/second (Tbps) or more per port/path or per port/path group in these devices. These data units may be protocol data units ("PDUs"), each of which may comprise one or more transfer data units ("TDUs"). Each TDU may be divided into one or more (e.g., two, etc.) storage data units ("SDUs"), each of which is stored or buffered within a separate entry of a SDU buffer. The SDU buffer comprises multiple SDU memory instances, each of which may be of the same maximum number of bits capable of storing a single SDU up to a SDU maximum data size.

A component in a network device such as a traffic manager or other suitable component may receive a sequence of (e.g., time ordered, successive, one or more, etc.) TDUs that constitute or belong to a PDU for temporary storage within various memories or buffers of the device. More specifically, SDUs partitioned or segmented from the TDUs of the same PDU can be stored in the SDU buffer—not necessarily arranged contiguously in the SDU buffer.

Data constructs such as PDU link descriptors (PLDs) may be generated and used to link different PDUs—for example received in an egress packet processing pipeline such as an egress queue of outgoing packets from a specific egress port/path or port/path group supporting relatively high bit rates such as terabits/second or more per port/path—together. Different data constructs such as cell link descriptors (CLDs) may be generated and used to link different TDUs —in the same sequence of TDUs of the same PDU— together. Some or all the PDU link descriptors and cell link descriptors can be stored in the same distributed link descriptor memory. The distributed link descriptor memory comprises multiple link memory instances, each of which may be of the same maximum number of bits capable of storing a single PDU or cell link descriptor up to a maximum link descriptor data size. The distributed link descriptor memory may include one or more different physical or logical memories such as one or more different physical or logical memory banks. In some operational scenarios, a PLD for a (network) packet and one or more CLDs associated with the PLD for the same packet may be stored in the same physical or logical memory (or memory bank/component) of the distributed link descriptor memory. In some other operational scenarios, a PLD for a (network) packet may be stored in a first physical or logical memory (or memory bank/component) of the distributed link descriptor memory, while one, some or all of one or more CLDs associated with the PLD for the same packet may be stored in a second physical or logical memory (or memory bank/component), different from the first physical or logical memory (or memory bank/component), of the distributed link descriptor memory. Additionally, optionally or alternatively, in some operational scenarios, PLDs for (e.g., all, different, over 90%, etc.) PDUs are stored in a first physical memory (or memory bank/component), whereas CLDs—which are used to store additional or overflow addresses that are not stored in some or all of the PLDS—are stored in a second physical memory (or memory bank/component). The second physical memory storing the CLDs may be decoupled from—e.g., may have independent or separate memory access paths from those of—the first physical memory storing the PLDs. The second physical memory may optionally have a different memory structure, or may be a different memory type, from that of the first physical memory. The first physical memory may support relatively fast memory accesses and/or relatively high concurrent memory accesses as compared with the second memory.

CLDs may be used with PLDs to store addresses for large multi-TDU packets or PDUs. The addresses in the CLDs may be those of selected SDUs (e.g., the very first SDUs if indirection is used; if no indirection, the CLDs contain all SDUs within a TDU; etc.), or optionally may be TDU addresses that are used to look up the addresses of the selected SDUs in a TDU map memory. The addresses of the selected SDUs in the TDUs may be used to derive other SDU addresses in the same TDUs through simple reference/address increment operations. Hence, SDU buffer addresses for SDUs in a TDU of a PDU can be derived or deduced from only information in packet/cell link descriptor(s) directly or indirectly with simple reference/memory increment operations.

A traffic manager in the network device or buffer management logic therein may receive a current TDU in a sequence of TDUs that belong to a current PDU for buffering. In response, the buffer management logic accesses, or attempts to access, a current PDU link descriptor for the current PDU, in a first memory instance in the plurality of memory instances of the distributed link descriptor memory.

If the current TDU is determined to be the very first TDU for the PDU, the current PDU link descriptor may not have been created in any memory instance of the distributed link descriptor memory such as the first memory instance. In response, the buffer management logic can (i) select a free or unoccupied memory instance in the distributed link descriptor memory from among the plurality of memory instances of the distributed link descriptor memory as the first memory instance, and (ii) create the current PDU link descriptor with the first memory instance by populating the first memory instance with data field values relating to the current PDU and/or the current TDU.

The current PDU link descriptor may include zero, one, two or more first data fields to maintain addresses relating to zero, one, two or more specific TDUs such as the zero, one. two or more very first TDUs, respectively, in the current PDU. Additionally, optionally or alternatively, the current PDU link descriptor may include one or more second data fields to maintain addresses of one or more cell link descriptor, respectively, when the first data fields have been exhausted, used or occupied by the addresses relating to the very first TDUs in the current PDU. In that case, in response to receiving the current TDU for buffering, the buffer management logic can access, or attempt to access, a current cell link descriptor in a second memory instance in the plurality of memory instances of the same distributed link descriptor memory.

If the current TDU is determined to be the very first TDU to be pointed to or referenced with the current cell link descriptor, the current cell link descriptor may not have been created in any memory instance of the distributed link descriptor memory such as the second memory instance. Hence, the buffer management logic can proceed to (i) select another free or unoccupied memory instance from among the plurality of memory instances of the distributed link descriptor memory as the second memory instance, (ii) create the current cell link descriptor with the second memory instance, and (iii) store an address—for example, the address of the very first SDU in all SDUs belonging to the current TDU—relating to the current TDU in the current cell link descriptor. The current cell link descriptor may be used to store up to a second fixed number of addresses relating to up to the second fixed number of TDUs, respectively.

If the current TDU is determined to be not the very first TDU to be pointed to or referenced with the current cell link descriptor, the buffer management logic can store an address—for example, the address of the very first SDU in all SDUs belonging to the current TDU—relating to the current TDU in the current cell link descriptor.

The current TDU may be divided into one or more SDUs up to a fixed number of (e.g., two, three or more, etc.) SDUs. If the current TDU comprises multiple SDUs, other addresses of other SDUs, other than the address of the very first SDU, may be derived or deduced by performing simple reference or address increment operations on the address of the very first SDU stored or maintained in the current packet or cell link descriptor.

In some operational scenarios, (SDU buffer) addresses of SDUs in a TDU of a PDU can be derived or deduced from information in packet/cell link descriptor(s) in combination with information in an entry—for the TDU—of a TDU map memory. For example, a packet/cell link descriptor may contain an address of the entry in the TDU map memory for the TDU. The address of the very first SDU of all SDUs in the TDU can be stored or maintained in the entry of the TDU map memory and looked up based on the address of the entry for the first SDU in the TDU.

In other aspects, the inventive subject matter encompasses computer apparatuses and/or computer-readable media configured to carry out the foregoing techniques.

2.0. Structural Overview

FIG. 1 illustrates example aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g., a TCP segment, etc.) to a second node 110 over a path that includes an intermediate node 110. This unit of data will be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g., frames and/or cells, etc.) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" combination of a source address, source port, destination address, destination port, and protocol, etc.). A flow is often intended to be sent in sequence, and network devices are therefore typically configured to send all data units within a given flow along a same path to ensure that the flow is received in sequence.

A node 110 may operate on network data at several different layers, and therefore view the same data as belonging to several different types of data units.

Figure 3:
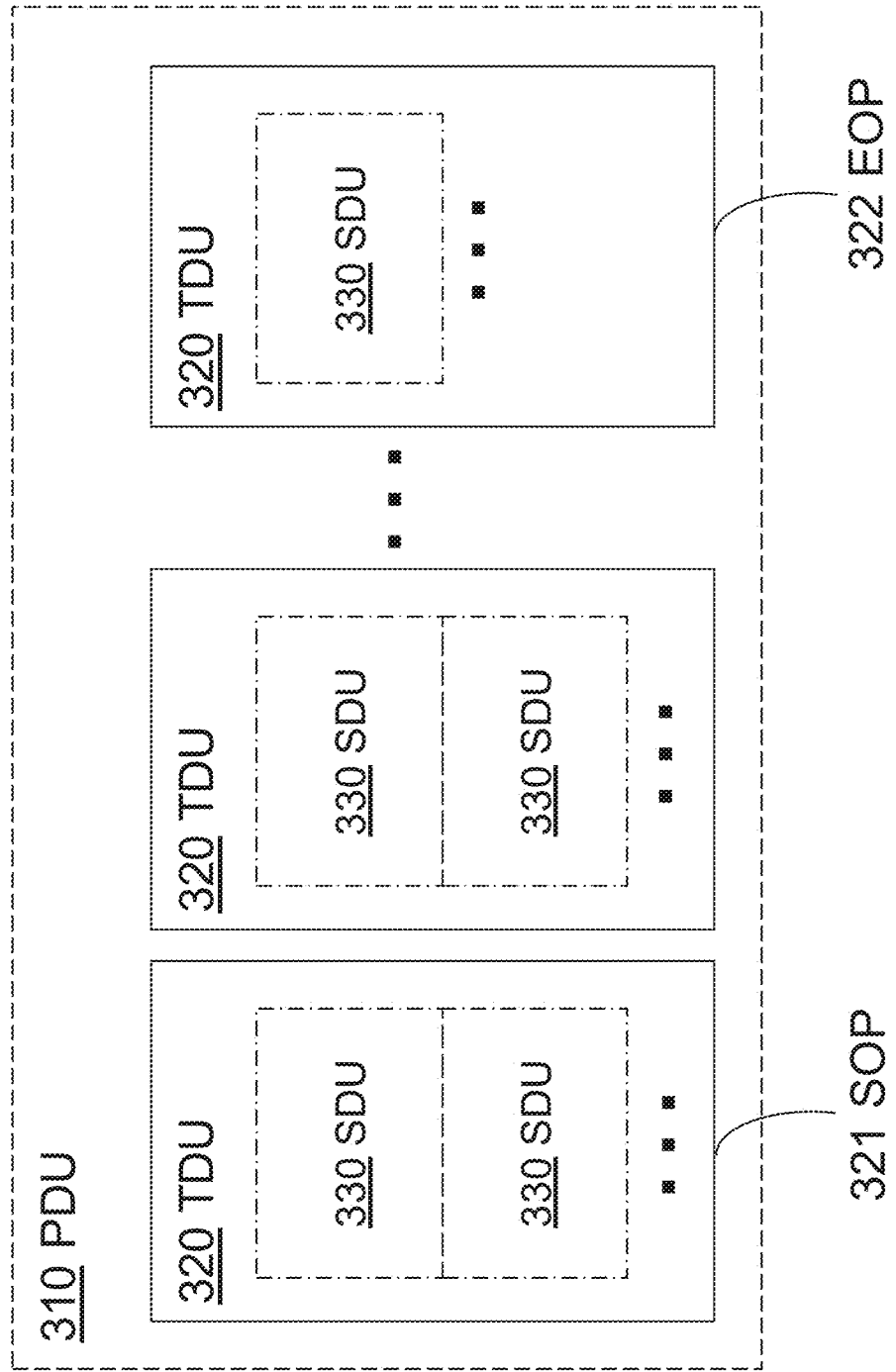
FIG. 3 illustrates different levels of data units.

FIG. 3 illustrates different levels of data units that a network node may act upon or with respect to, according to an embodiment. At a higher level, a node 110 may view data as belonging to protocol data units ("PDUs") 310 of a certain type, such as packets or data units at any other suitable network level.

The node 110 need not necessarily ever assemble the data in a PDU 310 together, but rather may in an embodiment act upon constituent portions of the PDU 310, which may be (e.g., logically, etc.) linked together by identifiers, packet and/or cell link descriptors, SDU addresses in a TDU map memory, or other suitable data constructs. These portions are referred to herein as transfer data units ("TDUs") 320. For instance, if the PDU 310 is a packet, the TDU 320 might be one or more cells or frames. The first TDU 320 in a PDU 310 is referred to as the start-of-packet ("SOP") 321, while the last TDU 320 in the PDU 310 is referred to as the end-of-packet ("EOP") 322. TDUs between the SOP and EOP are referred to as MOPs (Middle of Packet). TDUs that contain both the start and end of packets may be referred to as SEOPs.

Generally speaking, the TDU is the largest contiguous unit of data that certain internal components of a node 110 are configured to communicate between each other in a given period of time. For instance, a node 110 may have a component (e.g., traffic manager or a component portion therein, etc.) that is capable of receiving no more than a single TDU 320 from each interface during a single clock cycle. Additionally, in an embodiment, the contiguous portions of data sent by each port of a node 110 in a given period of time may be no larger than a TDU 320. In an embodiment, each TDU 320 is of a fixed size, except for the last TDU 320 in a PDU 310, which may be of a size less than the fixed size.

In an embodiment, for storage purposes, such as buffering, a TDU 320 may further be divided into storage data units ("SDUs") 330. In an embodiment, a SDU 330 is the largest contiguous portion of data that may be stored in a (memory) buffer entry. In other words, the maximum size of a SDU 330 is the same as the maximum size of a buffer entry. In an embodiment, the maximum number of SDUs 330 in a TDU 320 is fixed. However, an EOP TDU 322 may have less than this number of SDUs 330. Moreover, the last SDU 330 in a TDU 320 (e.g., the EOP TDU 322, etc.) may be smaller than maximum SDU size.

In an embodiment, TDU and SDU boundaries may be relative to the component acting upon the data. That is, for example, a node 110 whose traffic manager is configured to use TDUs of a first (e.g., maximum, fixed, etc.) size and SDUs of a second (e.g., maximum, fixed, etc.) size may further include other components that communicate or buffer data units of sizes other than the first size and the second size.

For convenience, many of the techniques described in this disclosure are described with respect to embodiments where the PDUs are IP packets in a L3 (level 3) network, and the TDUs are the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs, TDUs, and SDUs are of any other types of data structures communicated across a network, such as segments or datagrams. That is, in these contexts, other types of data structures may be used in place of packets, cells, frames, and so forth.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on, etc.). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
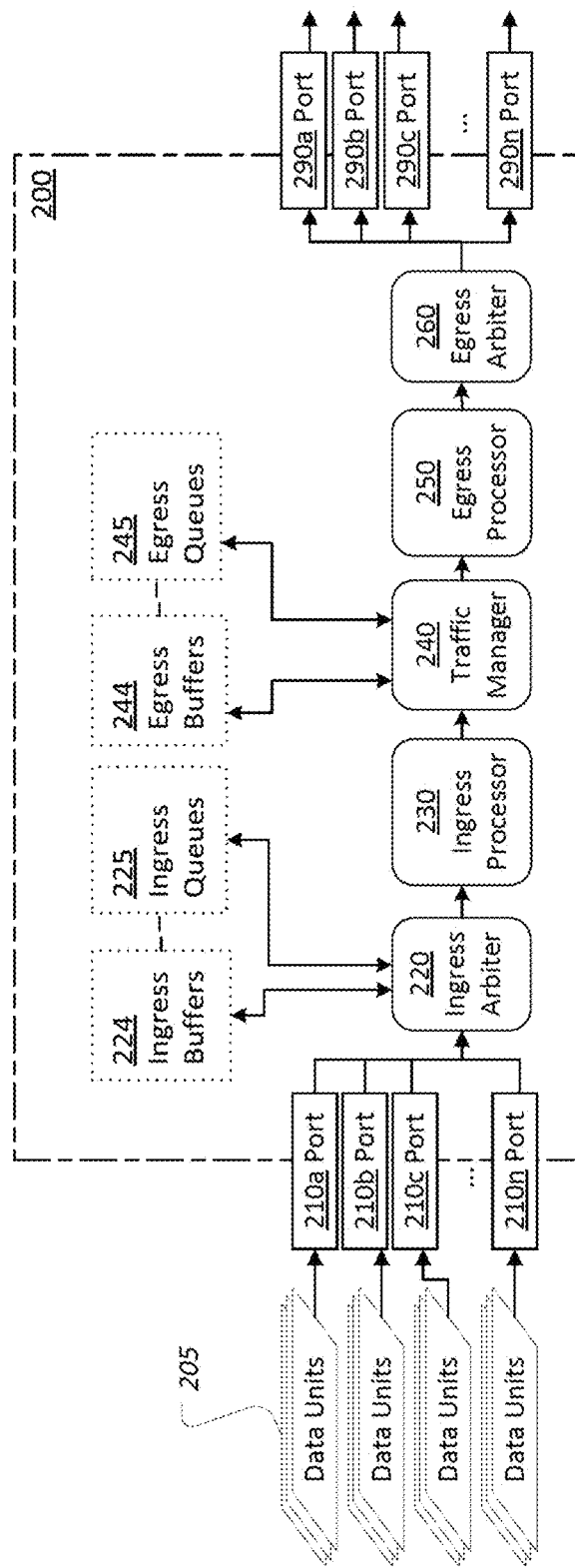
FIG. 2 illustrates example aspects of an example network device.

FIG. 2 illustrates example aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered in an ingress buffer 224 and queued in an ingress queue 225 by an ingress arbiter 220 until the data unit 205 can be processed by an ingress packet processor 230, and then delivered to an interconnect. From the interconnect, the data unit 205 may be forwarded to a traffic manager 240. The traffic manager 240 may store the data unit 205 in an egress buffer 244 and assign the data unit 205 to an egress queue 245. The traffic manager 240 manages the flow of the data unit 205 through the queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter 260 from which the data unit 205 is finally forwarded out another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210a-n, are inbound ("ingress") ports by which data units referred to herein as data units 205 are received over a network, such as network 110. Ports 290, including ports 290a-n, are outbound ("egress") ports by which at least some of the data units 205 are sent out to other destinations within the network, after having been processed by the network device 200.

Data units 205 may be of any suitable PDU type, such as packets, cells, frames, etc. In an embodiment, data units 205 are packets. However, the individual atomic data units upon which the depicted components may operate may be actually be subunits of the data units 205, such as the previously depicted TDU 320. For example, data units 205 may be received, acted upon, and transmitted at a cell or frame level. These cells or frames may be logically linked together as the data units 205 (e.g., packets, etc.) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g., network jacks or interfaces, etc.) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and a separate egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in some operational scenarios, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 230. On the other end, an egress packet processor 250 may input data units serially into another SerDes block, which outputs the data units in parallel to ports 290.

2.5. Packet Processors

A device 200 comprises one or more packet processing components that collectively implement forwarding logic by which the device 200 is configured to determine how to handle each data unit 205 that the device 200 receives. These packet processors components may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 230 and 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 230 and 250 configured to perform any number of processing tasks.

In an embodiment, the packet processors 230 and 250 within a device 200 may be arranged such that the output of one packet processor 230 or 250 may, eventually, be inputted into another packet processor 230 or 250, in such a manner as to pass data units 205 from certain packet processor(s) 230 and/or 250 to other packet processor(s) 230 and/or 250 in a sequence of stages, until finally disposing of the data units 205 (e.g., by sending the data units 205 out an egress port 290, "dropping" the data units 205, etc.). The exact set and/or sequence of packet processors 230 and/or 250 that process a given data unit 205 may vary, in some embodiments, depending on the attributes of the data unit 205 and/or the state of the device 200. There is no limit to the number of packet processors 230 and/or 250 that may be chained together in such a manner.

Based on decisions made while processing a data unit 205, a packet processor 230 or 250 may, in some embodiments, and/or for certain processing tasks, manipulate a data unit 205 directly. For instance, the packet processor 230 or 250 may add, delete, or modify information in a data unit header or payload. In other embodiments, and/or for other processing tasks, a packet processor 230 or 250 may generate control information that accompanies the data unit 205, or is merged with the data unit 205, as the data unit 205 continues through the device 200. This control information may then be utilized by other components of the device 200 to implement decisions made by the packet processor 230 or 250.

In an embodiment, a packet processor 230 or 250 need not necessarily process an entire data unit 205, but may rather only receive and process a subunit of a data unit 205, such as a TDU comprising header information for the data unit. For instance, if the data unit 205 is a packet comprising multiple cells, the first cell, or a first subset of cells, might be forwarded to a packet processor 230 or 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 230 or an egress packet processor 250. Generally, an ingress processor 230 resolves destinations for a traffic manager 240 to determine which ports 290 and/or queues 245 a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 may be regulated via an egress arbiter 260 coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by the packet processor(s) 230 and/or 250 at the same time, various components of device 200 may temporarily store data units 205 in memory structures referred to as buffers 244 while the data units 205 are waiting to be processed. For example, a certain packet processor 230 or 250 may only be capable of processing a certain number of data units 205, or portions of data units 205, in a given clock cycle, meaning that other data units 205, or portions of data units 205, destined for the packet processor 230 or 250 must either be ignored (e.g., dropped, etc.) or stored. At any given time, a large number of data units 205 may be stored in the buffers 244 of the device 200, depending on network traffic conditions.

A device 200 may include a variety of buffers 244, each utilized for varying purposes and/or components. Generally, a data unit 205 awaiting processing by a component is held in a buffer 244 associated with that component until the data unit 205 is "released" to the component for processing.

Buffers 244 may be implemented using any number of distinct banks 242a-n of memory. Each bank 242 may be a portion of any type of memory, including volatile memory and/or non-volatile memory. In an embodiment, each bank 242 comprises many addressable "entries" (e.g., rows, columns, etc.) in which data units 205, subunits, linking data, or other types of data, may be stored. The size of each entry in a given bank 242 is known as the "width" of the bank 242, while the number of entries in the bank 242 is known as the "depth" of the bank 242. The number of banks 242 may vary depending on the embodiment.

Each bank 242 may have associated access limitations. For instance, a bank 242 may be implemented using single-ported memories that may only be accessed once in a given time slot (e.g., clock cycle, etc.). Hence, the device 200 may be configured to ensure that no more than one entry need be read from or written to the bank 242 in a given time slot. A bank 242 may instead be implemented in a multi-ported memory to support two or more accesses in a given time slot. However, single-ported memories may be desirable in many cases for higher operating frequencies and/or reducing costs.

In an embodiment, in addition to buffer banks 242, a device may be configured to aggregate certain banks 242 together into logical banks 242 that support additional reads or writes in a time slot and/or higher write bandwidth. In an embodiment, each bank 242, whether logical or physical or of another (e.g., addressable, hierarchical, multi-level, sub bank, etc.) organization structure, is capable of being accessed concurrently with each other bank 242 in a same clock cycle, though full realization of this capability is not necessary.

Some or all of the components in device 200 that utilize one or more buffers 244 may include a buffer manager configured to manage use of those buffer(s) 244. Among other processing tasks, the buffer manager may, for example, maintain a mapping of data units 205 to buffer entries in which data for those data units 205 is stored, determine when a data unit 205 must be dropped because it cannot be stored in a buffer 244, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g., not at the same address location or even within the same bank 242, etc.). The one or more buffer entries in which a data unit 205 are stored are marked as utilized (e.g., in a "free" list, free or available if not marked as utilized, etc.) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks 242 and/or specific entries within those banks 242 randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks 242 may be utilized to store data units 205 received from different ports 210 or sets of ports 210. In an embodiment, the buffer assignment logic also or instead utilizes buffer state information, such as utilization metrics, to determine which bank 242 and/or buffer entry to assign to a data unit 205, or portion thereof. Other assignment considerations may include buffer assignment rules (e.g., no writing two consecutive TDUs from the same PDU to the same bank, etc.) and I/O scheduling conflicts, for example, to avoid assigning a data unit to a bank when there are no available write operations to that bank on account of other components reading content already in the bank.

Examples of improved buffer storage mechanisms are described in subsequent sections.

2.7. Queues

In an embodiment, to manage the order in which data units 205 are processed from the buffers, various components of a device 200 may implement queueing logic. For example, the flow of data units through ingress buffers 224 may be managed using ingress queues 225 while the flow of data units through egress buffers may be managed using egress queues.

Each data unit 205, or the buffer locations(s) in which the data unit 205 is stored, is said to belong to one or more constructs referred to as queues 245. Typically, a queue 245 is a set of memory locations (e.g., in the buffers, etc.) arranged in some order by metadata describing the queue 245. The memory locations may (and often are) non-contiguous relative to their addressing scheme and/or physical or logical arrangement. For example, the metadata for one queue 245 may indicate that the queue 245 is comprised of, in order, entry addresses 2, 50, 3, and 82 in a certain buffer.

In many embodiments, the sequence in which the queue 245 arranges its constituent data units 205 generally corresponds to the order in which the data units 205 or data unit portions in the queue 245 will be released and processed. Such queues 245 are known as first-in-first-out ("FIFO") queues, though in other embodiments other types of queues may be utilized. In some embodiments, the number of data units 205 or data unit portions assigned to a given queue 245 at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 230 and/or 250. For instance, a buffer manager within the traffic manager 240 may temporarily store data units 205 in buffers 244 as they await processing by egress processor(s) 250. A traffic manager 240 may receive data units 205 directly from a port 210, from an ingress processor 230, and/or other suitable components of device 200. In an embodiment, the traffic manager 240 receives one TDU from each possible source (e.g. each port 210) each clock cycle or other time slot.

Traffic manager 240 may include or be coupled to egress buffers 244 for buffering data units 205 prior to sending those data units 205 to their respective egress processor(s) 250. A buffer manager within the traffic manager 240 may temporarily store data units 205 in egress buffers 244 as they await processing by egress processor(s) 250. The number of egress buffers 244 may vary depending on the embodiment. A data unit 205 or data unit portion in an egress buffer 244 may eventually be "released" to one or more egress processor(s) 250 for processing, by reading the data unit 205 from the buffer 244 and sending the data unit 205 to the egress processor(s) 250. In an embodiment, traffic manager 240 may release up to a certain number of data units 205 from buffers 244 to egress processors 250 each clock cycle or other defined time slot.

Beyond managing the use of buffers 244 to store data units 205 (or copies thereof), a traffic manager 240 may include queue management logic configured to assign buffer entries to queues 245 and manage the flow of data units 205 through the queues 245. The traffic manager 240 may, for instance, identify a specific queue 245 to assign a data unit 205 to upon receipt of the data unit 205. The traffic manager 240 may further determine when to release—also referred to as "dequeuing"-data units 205 (or portions thereof) from queues 245 and provide those data units 205 to specific packet processor(s) 250. Buffer management logic in the traffic manager 240 may further "deallocate" entries in buffer 244 that store data units 205 are no longer linked to the traffic manager's queues 245. These entries are then reclaimed for use in storing new data through a garbage collection process.

In an embodiment, different queues 245 may exist for different destinations. For example, each port 210 and/or port 290 may have its own set of queues 245. The queue 245 to which an incoming data unit 205 is assigned and linked may, for instance, be selected based on forwarding information indicating which port 290 the data unit 205 should depart from. In an embodiment, a different egress processor 250 may be associated with each different set of one or more queues 245. In an embodiment, the current processing context of the data unit 205 may be used to select which queue 245 a data unit 205 should be assigned to.

In an embodiment, there may also or instead be different queues 245 for different flows or sets of flows. That is, each identifiable traffic flow or group of traffic flows is assigned its own set of queues 245 to which its data units 205 are respectively assigned. In an embodiment, different queues 245 may correspond to different classes of traffic or quality-of-service (QoS) levels. Different queues 245 may also or instead exist for any other suitable distinguishing properties of the data units 205, such as source address, destination address, packet type, and so forth.

Though only one ingress packet processor 230, one egress packet processor 250 and traffic manager 240 are depicted, a device 200 may comprise any number of packet processors 230 and/or 250 and traffic managers 240. For instance, different sets of ports 210 and/or ports 290 may have their own traffic manager 240 and packet processors 230 and/or 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 230 or 250 for any number of intermediate stages. The data unit 205 may thus pass through any number of traffic managers 240 and/or packet processors 230 and/or 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 230, such that data units 205 (or portions thereof) are assigned to buffers 244 only upon being initially processed by an ingress packet processor 230. Once in an egress buffer 244, a data unit 205 (or portion thereof) may be "released" to one or more egress packet processor(s) 250 for processing, either by the traffic manager 240 sending a link or other suitable addressing information for the corresponding buffer 244 to the egress packet processor 250, or by sending the data unit 205 directly.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues 245 for each of ports 1, 3, and 5. As another example, a data unit 205 may be replicated a number of times after it reaches the head of a queue 245 (e.g., for different egress processors 250, etc.). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual copy of the data unit 205 in buffers 244, or a single copy of the data unit 205 may be linked from a single buffer location to multiple queues 245 at the same time.

2.9. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to, etc.) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers 244 are overutilized, a queue 245 is over a certain size, and/or a data unit 205 has a certain characteristic.

2.10. Efficient Buffering Mechanisms

Figure 4:
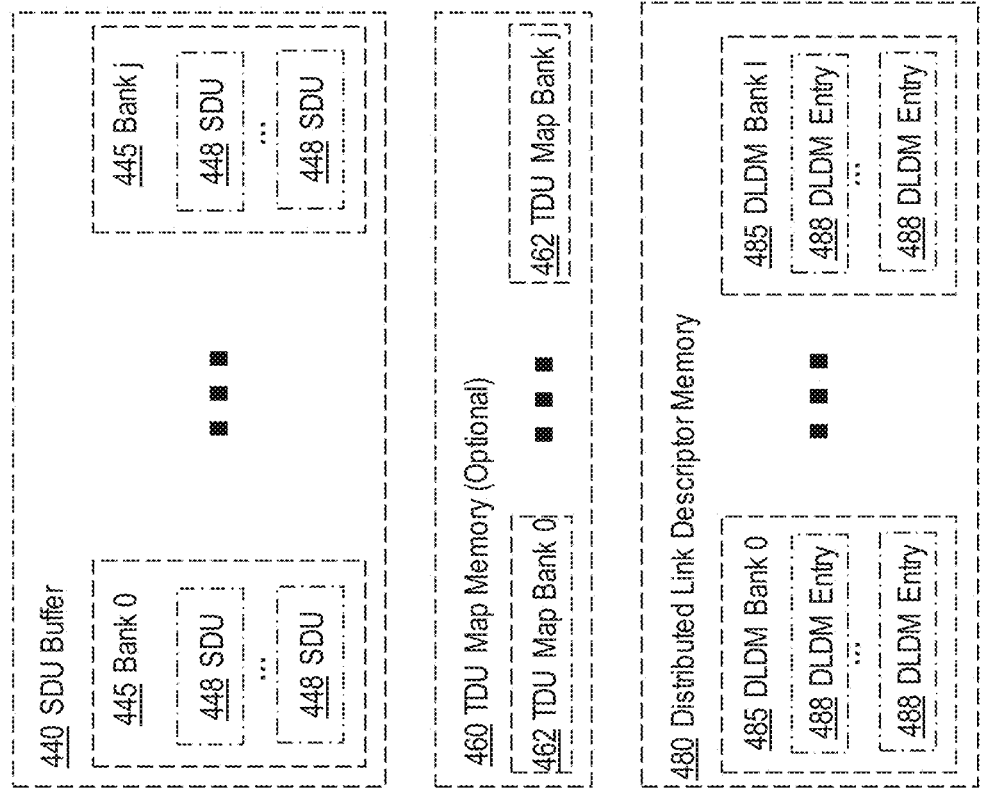
FIG. 4 illustrates an example buffer system.

FIG. 4 illustrates an example buffer system 400 configured to (e.g., relatively efficiently, etc.) buffer SDUs, as divided or derived from previously described TDUs 320 of PDUs, across multiple banks, according to an embodiment. Buffer system 400 buffers the SDUs for storage in SDU buffers 440. Each SDU is stored in a separate entry 448 within a bank 445 of the SDU buffers 440.

Each (SDU buffer) bank 445 may be a separate and distinct memory structure, such as a single-ported memory or double-ported memory, having a width equal to the maximum possible size of an SDU. In an embodiment, each SDU buffer bank 445 has a same depth, though in other embodiments some SDU buffer banks 445 may have different depths.

There may be any number of banks 445 within the SDU buffers 440. In an embodiment, the number of SDU buffer banks 445 is at least as large as the number of data units that the buffering component (e.g., the traffic manager, a buffer manager operating with the traffic manager, etc.) can receive each clock cycle, plus at least one additional SDU buffer bank 445 to support read operations. Moreover, there may be more than one SDU buffer bank 445 to support read operations, as well as additional SDU buffer banks(s) 445 to support other (e.g., concurrent or serialized access, etc.) needs.

Each SDU may be no greater in size than the maximum size of an SDU entry 448 within the SDU buffer banks 445 (e.g., than the "width" of the SDU buffer banks 445, etc.). In an embodiment, all TDUs are of a fixed TDU size except for the last TDU in a PDU, while all SDUs are of a fixed SDU size except for the last SDU in a TDU. For convenience, the TDUs and SDUs in such an embodiment will be referred to as being of a "fixed size," though it will be understood that the last TDU in the PDU and the last SDU in the TDU may be less than this fixed size.

Figure 5:
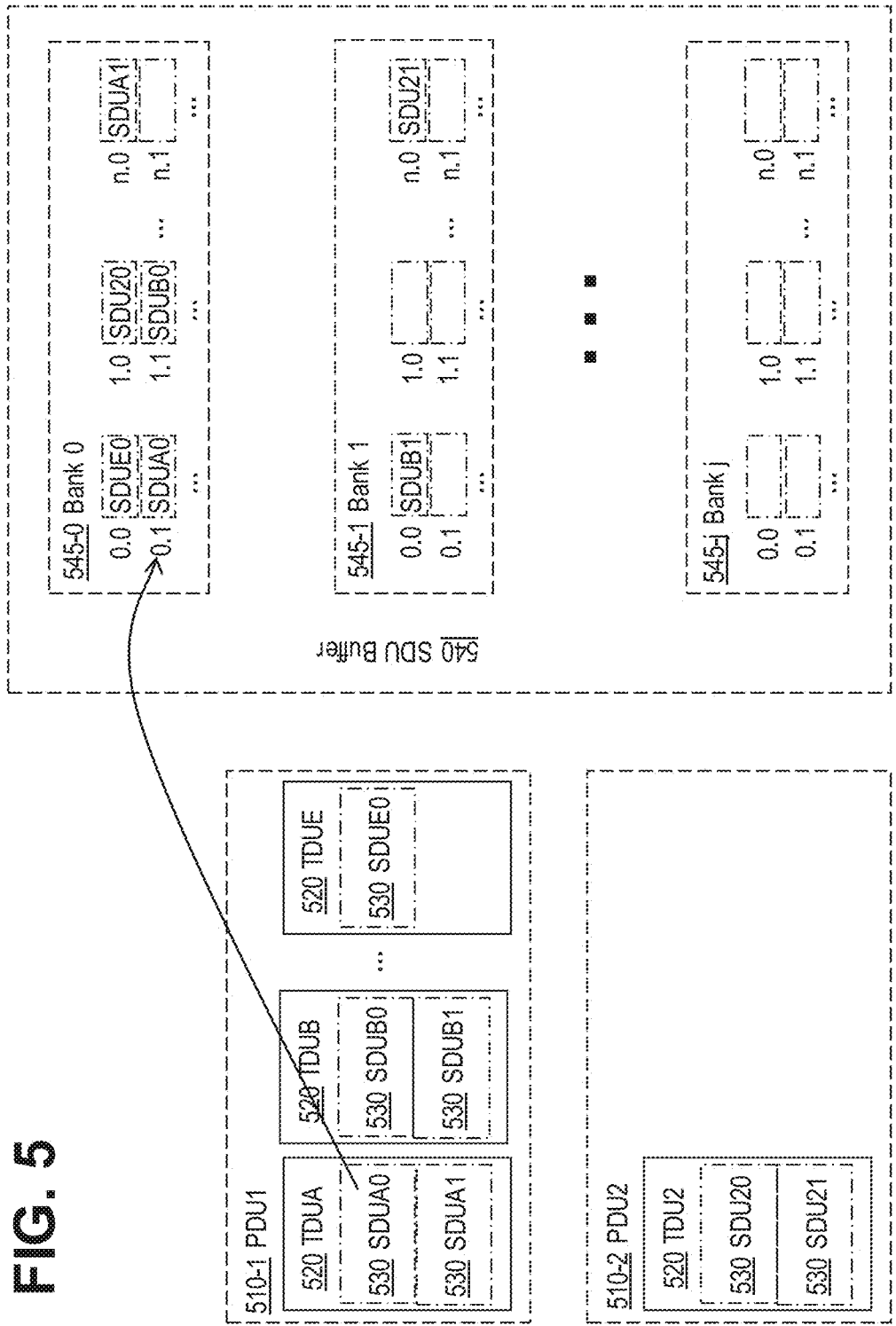
FIG. 5 illustrates an example arrangement of storage data units (SDUs) within an SDU buffer.

FIG. 5 illustrates an example arrangement of SDUs 530 within an SDU buffer 540 (or 440 of FIG. 4), according to an embodiment. The SDU buffer 540 may be an instance of SDU buffers in the network device as described herein, comprising SDU buffer banks 545-1 through 545-*j* (or 445 of FIG. 4). The depicted SDU buffer banks 545-1 through 545-*j*. For the purpose illustration only, each of the SDU buffer banks 545 may include, or may be partitioned into, n sub banks, where n is a positive integer no less than one. Entries within the SDU buffer banks 545 are addressed in the depiction according to the following scheme: sub bank number, followed by a dot, followed by entry address number. It will be appreciated that each bank 545 may have many additional entries than depicted in FIG. 5.

Two PDUs 510, labeled PDU1 and PDU2, are depicted as being buffered in SDU buffers 540, though of course many additional PDUs 510 may be buffered in non-depicted entries. Each PDU 510 comprises one or more TDUs 520 (or 320 of FIG. 3), which are divided into SDUs 530 (or 330 of FIG. 3). As depicted, the first SDU in the first TDU of PDU1, labeled SDUA0, has been placed at address 0.1 in sub bank 0 of SDU buffer bank 0 (545-0). For convenience, this address may be referred to as 0-0.1 (or simply 0.1), where the number in front of the dash refers to the SDU bank number, the number after the dash refers to the sub bank number, and the final number refers to the address within that sub bank. Of course, the depicted address scheme is merely illustrative, and a wide variety of alternative address schemes may be employed.

Other SDUs 530 have been placed at various other addresses within the SDU buffers. For instance, the next SDU in PDU1, labeled SDUA1, is stored at address 0-n.0 (or simply n.0). As another example, the first and only SDU in TDUE of PDU1, labeled SDUE0, is stored at address 0-0.0 (or simply 0.0), while the last SDU of PDU2, labeled SDU21, is stored at address 1-n.0. Note that PDU1 may include additional TDUs and SDUs beyond those depicted in PDU1 itself. These additional SDUs can also be stored at various addresses in SDU buffers 540.

Various supporting memory structures may also exist within a buffer system (e.g., 400 of FIG. 4, etc.) as described herein. For instance, there may be one or more free lists for each SDU buffer bank 545 that indicate which entries within those banks 545 are currently available (e.g., "empty" or "free", etc.) to store new SDUs. Moreover, to assist in reconstructing TDUs and PDUs from the buffered SDUs, various linking metadata may be maintained in memory or buffer of the network device or the buffer system (400 of FIG. 4) therein.

Under techniques as described herein, packets and TDUs/ SDUs therein can be linked relatively efficiently using a single set of (e.g., distributed, etc.) memories constituting the distributed link descriptor memory. Pointers to the packet link descriptor, cell link descriptors, addresses for SDUs or TDUs, etc., can be relatively efficiently stored and/or accessed in the same size entries of the distributed link descriptor memory using overlapping addressing. Costs/overheads (e.g., functional, wiring, testing, etc.) and complexities (e.g., designing, verification, etc.) associated with each memory instance or unit or each bank of the distributed link descriptor memory can be significantly reduced as compared with those of other approaches that use multiple sets of heterogenous memories of different entry sizes and structures. Some or all techniques as described herein can be implemented to provide solutions that use relatively small silicon area at relatively low complexity and increase switch density in terms of individual and/or aggregated packet ingress/egress rates in network devices.

PDU Link Descriptor

FIG. 7 illustrates an example PDU link descriptor 700 that contains PDU linking data for a PDU, for example in a sequence of (e.g., consecutive, ordered, etc.) PDUs. The sequence of PDUs may be associated with an egress queue, an egress pipeline or an egress port. As shown, the PDU link descriptor 700 contains a number of data fields used to store linking data portions to link the PDU to other PDUs in the sequence and/or to TDUs that belong to the PDU.

For example, the PDU link descriptor 700 may include a number of PDU linking data fields as follows:
- a first data field 702 ("Next Pointer"), which may store a DLDM reference or address pointing to a second PDU link descriptor for a second PDU. The second PDU may be immediately subsequent to the PDU in the sequence of PDUs.
- a second data field 704 ("Seq Number"), which may store a sequence number assigned to the PDU. The sequence number may (e.g., uniquely, distinctly, in a time wise order, etc.) identify or distinguish the PDU among all the PDUs in the sequence of PDUs, and arrange all PDUs in the sequence of PDUs in a specific order for PDU dequeuing operations.
- third and fourth data fields 706-0 and 706-1 ("Addr 0" and "Addr 1").
  i. In some operational scenarios, these address fields 706-0 and 706-1 may be used to store addresses of SDU buffer entries storing actual copies of up to two SDUs in up to two of the very first TDUs that belong to the PDU. For example, the third data field 706-0 may be used to store the address of an SDU buffer entry storing an actual copy of the very first SDU in the very first TDU in the PDU. Additionally, optionally or alternatively, the fourth data field 706-1 may be used to store the address of another SDU buffer entry storing an actual copy of the very first SDU in the second TDU, immediately following the very first TDU, in the PDU. Addresses of SDU buffer entries for storing actual copies of other SDUs of the first two TDUs may be derived or deduced from these addresses stored in the third and fourth data fields 706-0 and 706-1 by simple reference/address increment operations (e.g., adding the fixed maximum width or size of a SDU buffer entry, etc.).
  ii. In some operational scenarios, these address fields 706-0 and 706-1 may be used to store a first TDU address (in a TDU map memory 460 as illustrated in FIG. 4) for the very first TDU in the PDU and/or a second TDU address (in the TDU map memory 460) for the second TDU, immediately following the very first TDU, in the PDU, respectively. The first TDU address points to a first entry in the TDU map memory 460, which stores the address of an SDU buffer entry storing an actual copy of the very first SDU in the very first TDU in the PDU. Additionally, optionally or alternatively, the second TDU address points to a second different entry in the TDU map memory 460, which stores the address of another SDU buffer entry storing an actual copy of the very first SDU in the second TDU in the PDU. Addresses of SDU buffer entries for storing actual copies of other SDUs of the first two TDUs may be derived or deduced from these addresses stored in the first and second entries of the TDU map memory 460 as respectively pointed to by the TDU addresses stored in the third and fourth data fields 706-0 and 706-1 by simple reference/address increment operations (e.g., adding the fixed maximum width or size of a SDU buffer entry, etc.).

fifth and sixth data fields 708-0 and 708-1 ("Cell Link 0" and "Cell Link 1"), which may store a first DLDM address (in the DLDM or distributed link descriptor memory in which PDU link descriptors such as 700 are also stored or maintained) for the very first cell link descriptor created for the PDU and a second DLDM address (in the same DLDM or distributed link descriptor memory) for the second cell link descriptor created for the PDU, respectively. In some operational scenarios, one or both of these data fields 708-0 and 708-1 can be optionally used to store or overload address information for TDUs/SDUs (e.g., as indicated in a PDU metadata field of the same PLD, etc.), rather than only or always used to store address information such as pointer(s) to cell link descriptor(s).

a seventh PDU link descriptor data field 710 ("PDU Metadata"), which may store additional PDU metadata (e.g., multicast counter, replication count, etc.), other than or in addition to the PDU metadata stored in the foregoing data fields, for the PDU.

optional spare bits (not shown in FIG. 7), which may or may not be used to store additional PDU link descriptor data, depending on that the maximum total number of bits or bytes in non-spare-bits of a PDU link descriptor is fewer than the maximum total number of bits or bytes in non-spare-bits of a cell link descriptor.

It should be noted that, in various embodiments, a PDU link descriptor may or may not contain the same types and/or the same number of data fields as illustrated in FIG. 7. For example, in some embodiments, the PDU link descriptor may contain more or fewer—including zero—SDU or TDU addresses than that illustrated in FIG. 7. Additionally, optionally or alternatively, in some embodiments, the PDU link descriptor may contain more or fewer DLDM addresses or pointers of cell link descriptors than that illustrated in FIG. 7.

PDU Linking

Figure 9:
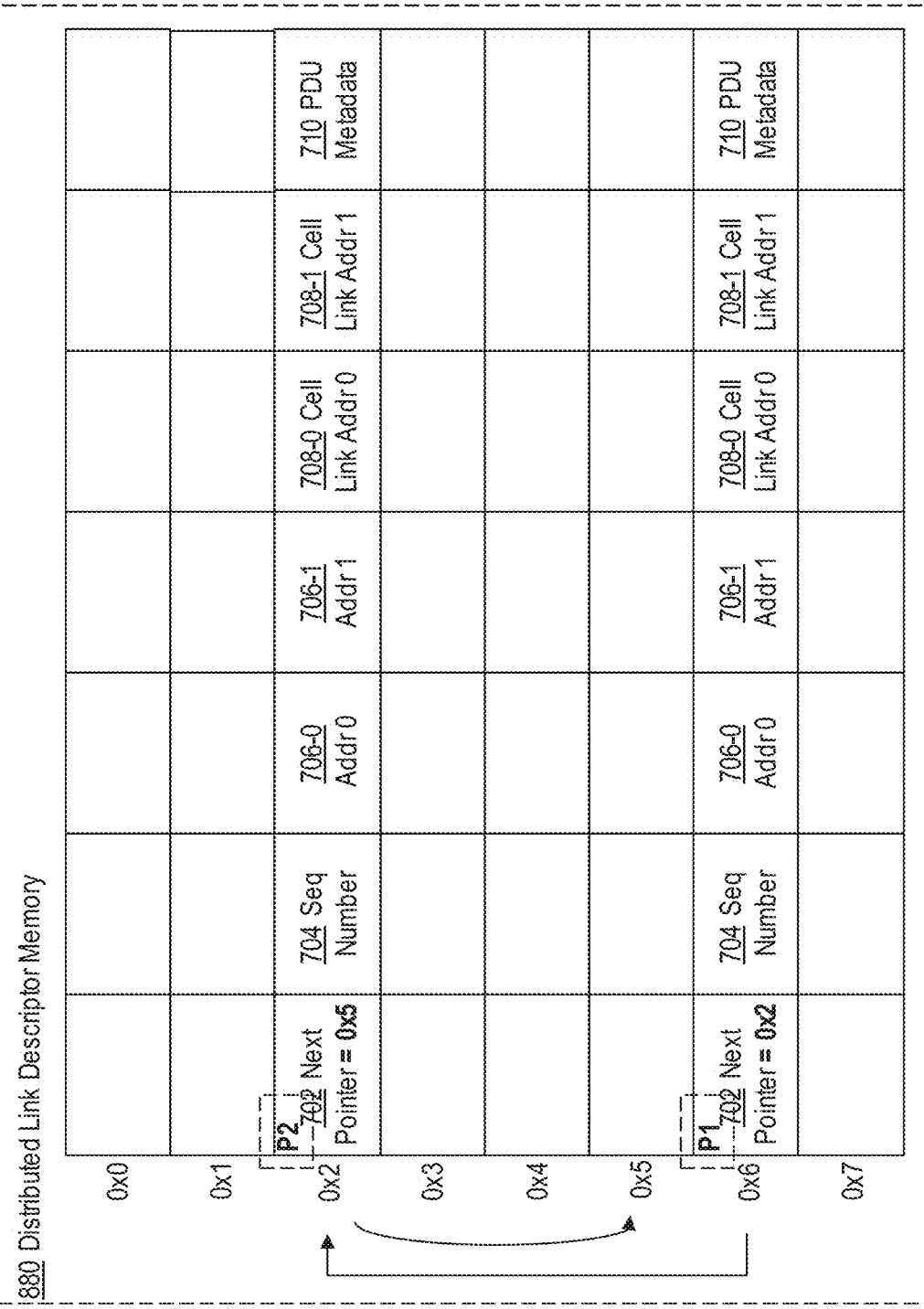
FIG. 9 illustrates example PDU link descriptors linking different PDUs.

FIG. 9 illustrates example PDU link descriptors in the DLDM 480 (of FIG. 4) to logically link or reference different PDUs in the sequence of PDUs. By way of illustration but not limitation, the sequence of PDUs may include a first PDU denoted as "P1" as well as a second PDU denoted as "P2", which immediately follows the first PDU "P1" in the sequence of PDUs. As shown, a first PDU link descriptor for the first PDU "P1" is stored in a first DLDM entry with a first DLDM address "0x6", whereas a second PDU link descriptor for the second PDU "P2" is stored in a second DLDM entry with a second DLDM address "0x2".

The first PDU link descriptor data field "Next Pointer" in the first PDU link descriptor for the first PDU "P1" is used to store the second DLDM address "0x2" that points to the second DLDM entry storing the second PDU link descriptor for the second PDU "P2" in the same DLDM.

Additionally, optionally or alternatively, the first PDU link descriptor data field "Next Pointer" in the second PDU link descriptor for the second PDU "P2" can be used to store a third DLDM address "0x5" that points to a third DLDM entry storing a third PDU link descriptor (the details of which is not shown in FIG. 9) for a third PDU in the same DLDM. The third PDU immediately follows the second PDU in the sequence of PDUs.

Cell Link Descriptor

FIG. 8 illustrates an example cell link descriptor 800, which may be of the same size of a packet link descriptor (e.g., 700 of FIG. 7, etc.) stored in the same set of memories constituting the DLDM. The cell link descriptor 800 may contains data fields to store up to a fixed number —denoted as N, where N is a positive integer greater than one—of addresses. The DLDM address (or address in the DLDM 480) of the cell link descriptor 800 can be identified or referenced in one of the cell link addresses 708-0 and 708-1 of a PDU link descriptor 700, as illustrated in FIG. 7, for the PDU.

For example, the cell link descriptor 800 may include a number of cell linking data fields as follows:

N data fields—"802-0 Addr 0" through "802-(N−1) Addr (N−1)"- to store (up to) N addresses.
  i. In some operational scenarios, each of these address fields 802-0 through 802-(N−1) may be used to store the address of an SDU buffer entry storing an actual copy of a specific (or representative) SDU in one of TDUs that belong to the PDU. Address(es) of SDU buffer entry or entries for storing actual copy or copies of other SDU(s)—other than the specific SDU—in the SDUs of the same TDU may be derived or deduced from the address of the SDU buffer entry storing the actual copy of the specific SDU by simple reference/address increment operations (e.g., adding the fixed maximum width or size of a SDU buffer entry, etc.).
  ii. In some operational scenarios, each of these address fields 802-0 through 802-(N−1) may be used to store a TDU address (in a TDU map memory 460 as illustrated in FIG. 4) for one of TDUs that belong to the PDU. The TDU address points to an entry in the TDU map memory 460. The entry stores the address of a specific (or representative) SDU such as the very first SDU in the TDU. Address(es) of SDU buffer entry or entries for storing actual copy or copies of other SDU(s)—other than the specific SDU—in the SDUs of the same TDU may be derived or deduced from the address of the SDU buffer entry storing the actual copy of the specific SDU by simple reference/ address increment operations (e.g., adding the fixed maximum width or size of a SDU buffer entry, etc.).

optional spare bits (as illustrated in FIG. 8), which may or may not be used to store additional cell link descriptor data, depending on that the maximum total number of bits or bytes in non-spare-bits of a PDU link descriptor is more than the maximum total number of bits or bytes in non-spare-bits of a cell link descriptor.

Hence, through the use of spare bits in one of the PDU link descriptor 700 and the cell link descriptor 800, the sizes of these link descriptors 700 and 800 can be matched, aligned or padded to the same size that equals to the maximum number of bits allowed to be maintained or stored in each entry in the DLDM 480.

It should be noted that, in various embodiments, a cell link descriptor may or may not contain the same types and/or the same number of data fields as illustrated in FIG. 8. For example, in some embodiments, the cell link descriptor may contain more or fewer SDU or TDU addresses than that illustrated in FIG. 8.

PDU and Cell Linking

Figure 10:
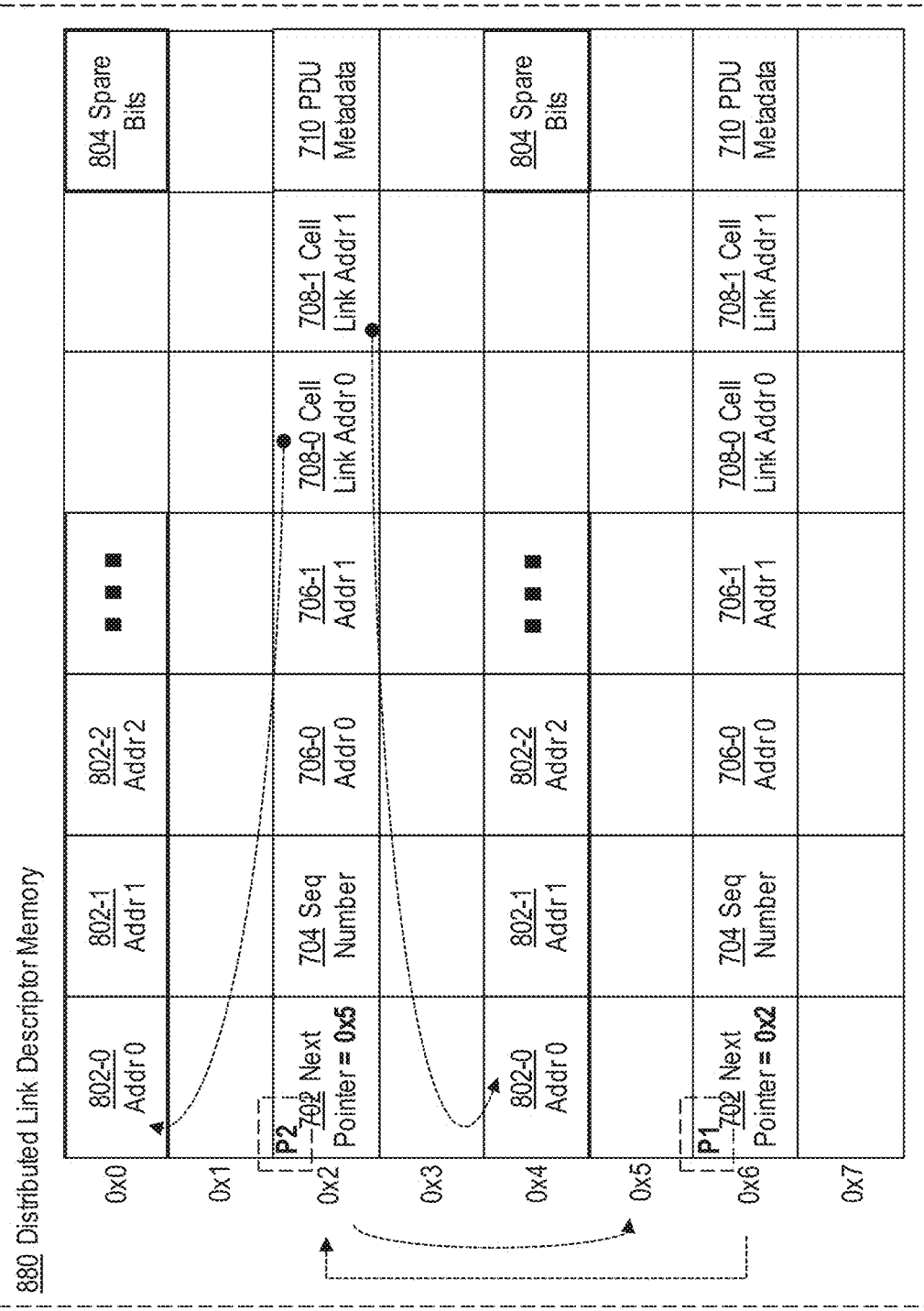
FIG. 10 illustrates example PDU and cell link descriptors linking PDUs and TDUs.

FIG. 10 illustrates example PDU and cell link descriptors in the DLDM 480 (of FIG. 4) that logically link or reference different PDUs and TDUs therein in the sequence of PDUs.

Similar to FIG. 9, a first PDU link descriptor for the first PDU "P1" is stored in a first DLDM entry with a first DLDM address "0x6", whereas a second PDU link descriptor for the second PDU "P2" is stored in a second DLDM entry with a second DLDM address "0x2". The first PDU link descriptor data field "Next Pointer" in the first PDU link descriptor for the first PDU "P1" is used to store the second DLDM address "0x2" that points to the second DLDM entry storing the second PDU link descriptor for the second PDU "P2" in the same DLDM. In addition, the first PDU link descriptor data field "Next Pointer" in the second PDU link descriptor for the second PDU "P2" can be used to store a third DLDM address "0x5" that points to a third DLDM entry storing a third PDU link descriptor (not shown in FIG. 8) for a third PDU in the same DLDM, where the third PDU immediately follows the second PDU in the sequence of PDUs.

For the purpose of illustration, for the second PDU "P2", the data fields 706-0 and 706-1 of the second PDU link descriptor for the second PDU "P2" have been populated or used to store addresses for the very first two TDUs that belong to the second PDU "P2".

Addresses for additional TDUs, other than the very first TDUs, in all TDUs that belong to the second PDU "P2" may be stored with one of cell link descriptors whose DLDM addresses are stored or referenced in the second PDU link descriptor for the second PDU "P2". The DLDM may include one or more different physical or logical memories such as one or more different physical or logical memory banks (e.g., 485 of FIG. 4, etc.). In some operational scenarios, the second PDU link descriptor for the second PDU "P2" and one or more CLDs associated with the second PDU link descriptor for the same packet "P2" may be stored in the same physical or logical memory (or memory bank/component) of the DLDM 480. In some other operational scenarios, the second PDU link descriptor for the second PDU "P2" may be stored in a first physical or logical memory (or memory bank/component) of the distributed link descriptor memory, while one, some or all of one or more CLDs associated with the second PDU link descriptor for the second PDU "P2" may be stored in a second physical or logical memory (or memory bank/component), different from the first physical or logical memory (or memory bank/component), of the DLDM 480.

For example, a first cell link descriptor whose DLDM address "0x0" is stored or referenced in the data field 708-0 ("Cell Link Addr 0") in the second PDU link descriptor for the second PDU "P2" may be used to store—in the data fields 802-0, 802-1, 802-2, etc. —the addresses for a first subset of the additional TDUs other than the very first TDUs in all the TDUs that belong to the second PDU "P2". Similarly, a second cell link descriptor whose DLDM address "0x4" is stored or referenced in the data field 708-1 ("Cell Link Addr 1") in the second PDU link descriptor for the second PDU "P2" may be used to store—in the data fields 802-0, 802-1, 802-2, etc.—the addresses for a second subset of the additional TDUs other than the very first TDUs in all the TDUs that belong to the second PDU "P2". The first subset of the additional TDUs and the second subset of the additional TDUs may be mutually exclusive from each other, and together constitute the (entire) additional TDUs in all the TDUs that belong to the second PDU "P2".

TDU Map Memory

As noted, in some operational scenarios, addresses of SDU buffer entries storing or buffering actual copies of specific SDUs in TDUs of a PDU may be directly stored or maintained in data fields of PDU and/or cell link descriptors for the PDU. Addresses of SDU buffer entries for remaining SDUs in the TDUs of the PDU may be derived, deduced or inferred through performing reference/address increment operations on the addresses stored or maintained in the PDU and/or cell descriptors. In these operational scenarios, a TDU map memory 460 of FIG. 4 may not be used to derive or deduce these addresses of SDU buffer entries storing or buffering actual copies of SDUs in the PDU.

In contrast, in some operational scenarios, addresses of SDU buffer entries storing or buffering actual copies of specific SDUs in TDUs of a PDU may not be directly stored or maintained in data fields of PDU and/or cell link descriptors for the PDU. Rather, addresses of SDU buffer entries storing or buffering actual copies of specific SDUs such as the very first SDUs in TDUs of a PDU may be directly stored or maintained in entries of the TDU map memory 460 of FIG. 4. Addresses of SDU buffer entries for remaining SDUs in the TDUs of the PDU may be derived, deduced or inferred through performing reference/address increment operations on the addresses stored or maintained in the entries of the TDU map memory 460. In these operational scenarios, addresses of the entries in the TDU map memory 460 may be stored or maintained in data fields of PDU and/or cell link descriptors for the PDU. Hence, in these operational scenarios, the TDU map memory 460 of FIG. 4 may be used in combination with the PDU/cell link descriptors to derive or deduce the addresses of SDU buffer entries storing or buffering the SDUs of the TDUs in the PDU.

For each TDU in the PDU, there may be a corresponding entry in the TDU map memory 460. As illustrated in FIG. 5, SDUs 530 in TDUs 520 of a given PDU 510 such as 510-1 and 510-2 can be organized and/or referenced using packet/cell link descriptors. Each of these packet/cell link descriptors can be stored in a respective entry of a distributed link descriptor memory (DLDM) 480 of FIG. 4. In operational scenarios, in which the packet/cell link descriptors are used to store or maintain TDU addresses or addresses of entries in the TDU map memory 460, SDU addresses—or addresses of SDU buffer entries storing or buffering actual copies of the SDUs 530—can be derived or deduced from the entries of the TDU map memory 460. By maintaining the TDU addresses in the packet/cell link descriptors stored in the distributed link descriptor memory 480 and the SDU addresses in the entries stored in the TDU map memory 460, a buffer system such as buffer system 400 may easily reconstruct the TDUs 520 of the given PDU 510 from the individually buffered SDUs 530 in the SDU buffers 540 of FIG. 5 (or 440 of FIG. 4).

Figure 6:
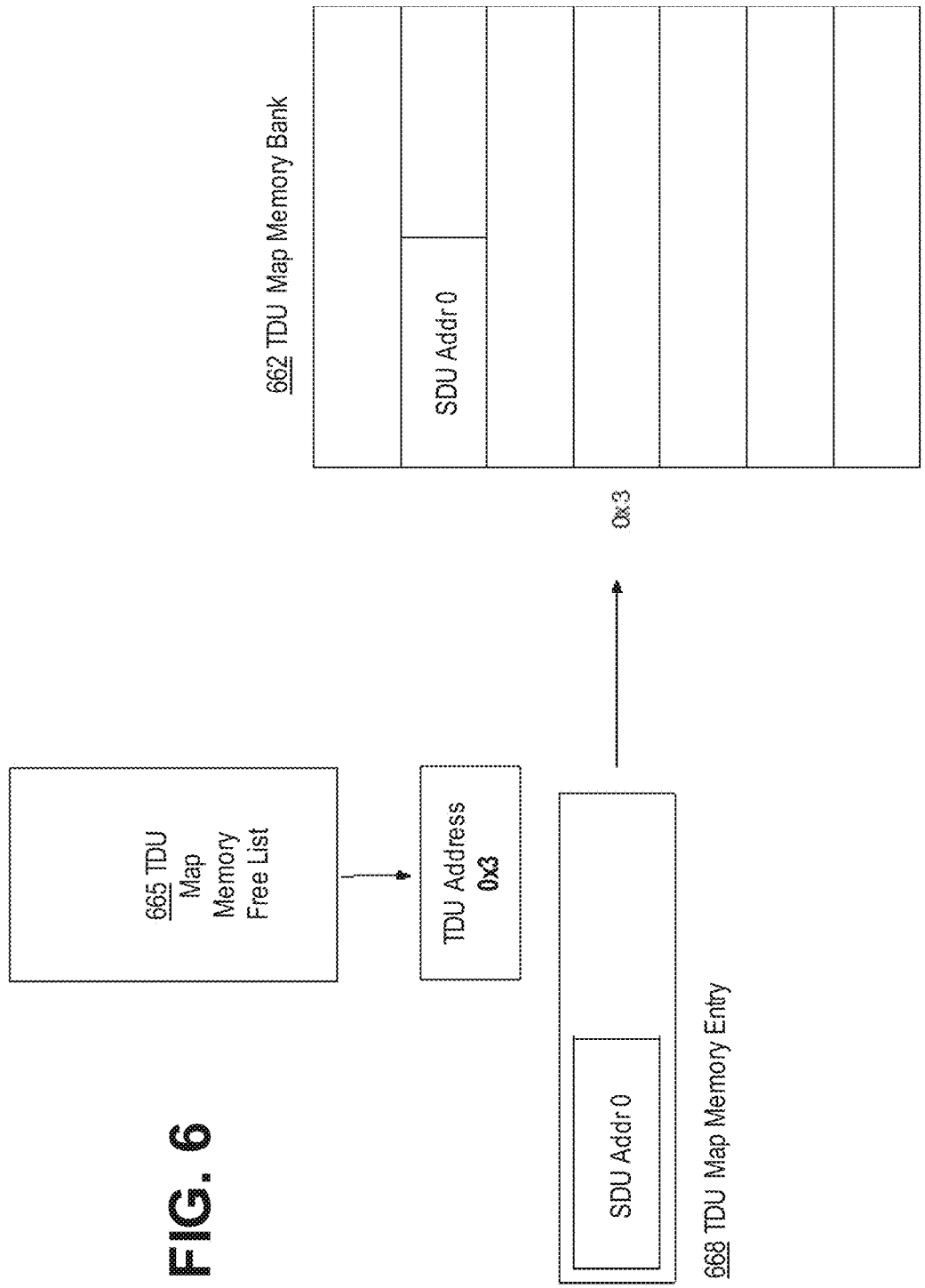
FIG. 6 illustrates an example entry in a transfer data unit (TDU) map memory bank.

Although the TDU map memory 460 may take any suitable form, in an embodiment, the TDU map memory may be composed of one or more (memory) banks, also referred to as TDU map banks 462 as illustrated in FIG. 4 (or 662 in FIG. 6). In a non-limiting example, for each SDU buffer bank 445 of the SDU buffers 440, a corresponding TDU map bank 462 (or 662 in FIG. 6) may be used to store or maintain addresses of SDU buffer entries that store or buffer actual copies of SDUs of TDUs in the SDU buffer bank 445.

Each (TDU map memory) entry may be of sufficient size to identify, by reference or by address, address of an entry of an SDU buffer bank for at least one SDU, for example the very first SDU, of all SDUs belong to a TDU.

FIG. 6 illustrates an example entry 668 in a TDU map memory bank 662 (or 462 of FIG. 4). The entry 668 assigned to a TDU may be of a size sufficiently large to store at least one address for at least one entry of SDU buffer for at least one SDU of SDUs that belong to the same TDU. For the purpose of illustration, in FIG. 6, the entry 668 may store an address (denoted as "SDU Addr 0") of a specific SDU buffer entry 448 which buffers or maintains an actual copy of a specific (or representative) SDU such as the very first SDU that belongs to the TDU.

The buffer system 400 may further maintain a TDU address free list 665 to indicate which TDU map memory entries in the TDU map memory 460 or a bank (e.g., 662 of FIG. 6, etc.) therein are currently free or not yet assigned to store addresses of SDU buffer entries for any TDUs.

In these operational scenarios, in which the TDU map memory 460 is used to store SDU addresses, a TDU in a given PDU may be assigned to and/or accessed with a specific TDU (map memory) address (e.g., "0x3" as illustrated in FIG. 6, etc.) that points to a specific entry in a specific TDU map bank such as 662 of FIG. 6 in the TDU memory bank 460 of FIG. 4.

2.11. Miscellaneous

Device 200 illustrates only one of many possible arrangements of devices configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

Furthermore, figures herein illustrate but a few of the various arrangements of memories that may be utilized to implement the described buffering techniques. Other arrangements may include fewer or additional elements in varying arrangements. For instance, there may be additional or fewer banks. Moreover, there may be varying numbers of entries having different addressing schemes.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

3.0. Functional Overview

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in a device 1300 that utilizes some or all of the buffering mechanisms described herein. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Linking TDUS with PLD

In response to receiving the very first TDU of a PDU for buffering, a buffer manager—or a distributed link descriptor memory manager implemented or included therein—such as a buffer management logic implemented in a traffic manager can create a PDU link descriptor 700 for the PDU and stored the PDU link descriptor 700 at an entry of the DLDM 480 of FIG. 4. The entry of the DLDM 480 may be selected from presently free and available entries in the DLDM 480 and subsequently marked as no longer free or not available. The buffer manager may partition or segment the first TDU into a (e.g., fixed, two, three, up to a maximum, etc.) number of SDUs and use one or more SDU entry free lists to locate the same number of SDU buffer entries in SDU buffers 440 for storing or buffering actual copies of the SDUs that belong to the first TDU. These SDU buffer entries can be determined as free or available based on the SDU entry free lists; assigned to the SDUs, respectively; subsequently marked as no longer free or not available in the SDU buffer 440. The actual copies of the SDUs that belong to the first TDU can be—for example, caused by the buffer management logic to be—stored or buffered in the SDU buffer entries assigned to the first TDU.

An address of a specific SDU entry such as the address of the very first SDU entry among the SDU entries respectively assigned to the SDUs of the first TDU can be stored or maintained in an address field such as 706-0 or 706-1 of a PDU link descriptor 700 of FIG. 7 created for the PDU. As this TDU is the very first in the PDU, the address field 706-0 will be available and hence can be used to store or maintain the address of the specific SDU entry for the first TDU. This completes the buffering or write operation for the first TDU received for the PDU.

Similarly, in response to receiving the second TDU for buffering, the buffer management logic may partition or segment the second TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the second TDU. These SDU buffer entries can be determined as free or available based on the SDU entry free lists; assigned to the SDUs, respectively; subsequently marked as no longer free or not available in the SDU buffer 440. The actual copies of the SDUs that belong to the second TDU can be—for example, caused by the buffer management logic to be—stored or buffered in the SDU buffer entries assigned to the second TDU.

An address of a specific SDU entry such as the address of the very first SDU entry among the SDU entries respectively assigned to the SDUs of the second TDU can be stored or maintained in an address field 706-1 of the PDU link descriptor 700 of FIG. 7 created for the PDU. This completes the buffering or write operation for the second TDU received for the PDU.

This TDU buffering process such as used for buffering the second TDU can be repeated for additional TDUs of the PDU until all data fields of the PDU link descriptor 700 for storing or maintaining addresses of SDU buffer entries are exhausted.

3.2. Linking TDUS with PLD/CLD

Additionally, optionally or alternatively, in some operational scenarios, an address of an SDU buffer entry for storing or buffering a specific SDU of SDUs belonging to a TDU of a PDU can be stored or maintained in an address field such as one of 802-0 through 802-(N−1) of a cell link descriptor 800 of FIG. 8 created for the PDU. The address of the cell link descriptor 800 may be stored or maintained in a cell link descriptor address such as 708-0 or 708-1 in the PDU link descriptor 700 of FIG. 7.

For the purpose of illustration only, the PDU link descriptor 700 for the PDU contains two data fields for storing or maintaining addresses of SDU buffer entries. Thus, the data fields of the PDU link descriptor 700 for storing or maintaining addresses of SDU buffer entries are exhausted for the two very first TDUs in the PDU.

In response to receiving the third TDU for buffering, the buffer management logic can create a first link descriptor 800 for the PDU and stored the first cell link descriptor 800 at an entry of the DLDM 480 of FIG. 4. The entry of the DLDM 480 may be selected from presently free and available entries in the DLDM 480 and subsequently marked as no longer free or not available. The address of the entry in the DLDM 480 assigned to store the first cell link descriptor 800 may be stored in the first (cell link descriptor) address field 708-0 of the PDU link descriptor 700 created for the PDU for the purpose of referencing or linking additional TDUs/SDUs. The buffer management logic may partition or segment the third TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the third TDU. These SDU buffer entries can be determined as free or available based on the SDU entry free lists; assigned to the SDUs, respectively; subsequently marked as no longer free or not available in the SDU buffer 440. The actual copies of the SDUs that belong to the third TDU can be—for example, caused by the buffer management logic to be—stored or buffered in the SDU buffer entries assigned to the third TDU.

An address of a specific SDU entry such as the address of the very first SDU entry among the SDU entries respectively assigned to the SDUs of the third TDU can be stored or maintained in an address field 802-0 of the first cell link descriptor 800 of FIG. 8 created for the PDU. This completes the buffering or write operation for the third TDU received for the PDU.

In response to receiving the fourth TDU for buffering, the buffer management logic may partition or segment the fourth TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the fourth TDU. These SDU buffer entries can be determined as free or available based on the SDU entry free lists; assigned to the SDUs, respectively; subsequently marked as no longer free or not available in the SDU buffer 440. The actual copies of the SDUs that belong to the fourth TDU can be—for example, caused by the buffer management logic to be—stored or buffered in the SDU buffer entries assigned to the fourth TDU.

An address of a specific SDU entry such as the address of the very first SDU entry among the SDU entries respectively assigned to the SDUs of the fourth TDU can be stored or maintained in the next presently unused address field (in this example 802-1) of the first cell link descriptor 800 of FIG. 8 created for the PDU. This completes the buffering or write operation for the fourth TDU received for the PDU.

This TDU buffering process such as used for the fourth TDU can be repeated for additional TDUs of the PDU until all data fields 802-0 through 802-(N−1) of the first link descriptor 800 for storing or maintaining addresses of SDU buffer entries are exhausted.

In response to receiving the (N+2)-th TDU for buffering, the buffer management logic can create a second link descriptor 800 for the PDU and stored the second cell link descriptor 800 at an entry of the DLDM 480 of FIG. 4. The entry of the DLDM 480 may be selected from presently free and available entries in the DLDM 480 and subsequently marked as no longer free or not available. The address of the entry in the DLDM 480 assigned to store the second cell link descriptor 800 may be stored in the second (cell link descriptor) address field 708-1 of the PDU link descriptor 700 created for the PDU for the purpose of referencing or linking additional TDUs/SDUs. The buffer management logic may partition or segment the (N+2)-th TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the (N+2)-th TDU. These SDU buffer entries can be determined as free or available based on the SDU entry free lists; assigned to the SDUs, respectively; subsequently marked as no longer free or not available in the SDU buffer 440. The actual copies of the SDUs that belong to the (N+2)-th TDU can be—for example, caused by the buffer management logic to be—stored or buffered in the SDU buffer entries assigned to the (N+2)-th TDU.

An address of a specific SDU entry such as the address of the very first SDU entry among the SDU entries respectively assigned to the SDUs of the (N+2)-th TDU can be stored or maintained in an address field 802-0 of the second cell link descriptor 800 of FIG. 8 created for the PDU. This completes the buffering or write operation for the (N+2)-th TDU received for the PDU.

In response to receiving the (N+3)-th TDU for buffering, the buffer management logic may partition or segment the (N+3)-th TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the (N+3)-th TDU. These SDU buffer entries can be determined as free or available based on the SDU entry free lists; assigned to the SDUs, respectively; subsequently marked as no longer free or not available in the SDU buffer 440. The actual copies of the SDUs that belong to the (N+3)-th TDU can be—for example, caused by the buffer management logic to be—stored or buffered in the SDU buffer entries assigned to the (N+3)-th TDU.

An address of a specific SDU entry such as the address of the very first SDU entry among the SDU entries respectively assigned to the SDUs of the (N+3)-th TDU can be stored or maintained in the next presently unused address field (in this example 802-1) of the second cell link descriptor 800 of FIG. 8 created for the PDU. This completes the buffering or write operation for the (N+3)-th TDU received for the PDU.

This TDU buffering process such as used for the (N+3)-th TDU can be repeated for additional TDUs of the PDU until all data fields 802-0 through 802-(N−1) of the second link descriptor 800 for storing or maintaining addresses of SDU buffer entries are exhausted.

3.3. Linking TDUS with PLD/CLD and TDU Map Memory

As noted, in some operational scenarios, addresses of SDU buffer entries storing or buffering actual copies of specific SDUs in TDUs of a PDU may be directly stored or maintained in data fields of PDU and/or cell link descriptors for the PDU.

In contrast, in some operational scenarios, a TDU map memory 460 of FIG. 4 may be used in combination with PDU/cell link descriptors to derive or deduce addresses of SDU buffer entries storing or buffering SDUs of TDUs in a PDU.

In these operational scenarios, in response to receiving the very first TDU of a PDU for buffering, a buffer manager such as a buffer management logic implemented in a traffic manager can create a PDU link descriptor 700 for the PDU and stored the PDU link descriptor 700 at an entry of the DLDM 480 of FIG. 4. The entry of the DLDM 480 may be selected from presently free and available entries in the DLDM 480 and subsequently marked as no longer free or not available. The buffer manager may partition or segment the first TDU into a (e.g., fixed, two, three, up to a maximum, etc.) number of SDUs and use one or more SDU entry free lists to locate the same number of SDU buffer entries in SDU buffers 440 for storing or buffering actual copies of the SDUs that belong to the first TDU. These SDU buffer entries can be determined as free or available based on the SDU entry free lists; assigned to the SDUs, respectively; subsequently marked as no longer free or not available in the SDU buffer 440. The actual copies of the SDUs that belong to the first TDU can be—for example, caused by the buffer management logic to be —stored or buffered in the SDU buffer entries assigned to the first TDU.

An address of a specific SDU entry such as the address of the very first SDU entry among the SDU entries respectively assigned to the SDUs of the first TDU can be stored or maintained in an entry of a TDU map memory 460. The entry of the TDU map memory 460 can be selected or determined as free or available using one or more TDU map memory free lists, assigned to the first TDU, and subsequently marked as not free or not available. The buffer management logic can store the address of the entry of the TDU map memory 460 in a data field such as 706-0 of the PDU link descriptor for the PDU to which the first TDU belong. This completes the buffering or write operation for the first TDU received for the PDU.

In response to receiving the second TDU of the PDU for buffering, the buffer management logic may partition or segment the second TDU into a (e.g., fixed, two, three, up to a maximum, etc.) number of SDUs and use one or more SDU entry free lists to locate the same number of SDU buffer entries in SDU buffers 440 for storing or buffering actual copies of the SDUs that belong to the second TDU. These SDU buffer entries can be determined as free or available based on the SDU entry free lists; assigned to the SDUs, respectively; subsequently marked as no longer free or not available in the SDU buffer 440. The actual copies of the SDUs that belong to the second TDU can be—for example, caused by the buffer management logic to be—stored or buffered in the SDU buffer entries assigned to the second TDU.

An address of a specific SDU entry such as the address of the very first SDU entry among the SDU entries respectively assigned to the SDUs of the second TDU can be stored or maintained in an entry of a TDU map memory 460. The entry of the TDU map memory 460 can be selected or determined as presently free or available using one or more TDU map memory free lists, assigned to the second TDU, and subsequently marked as not free or not available. The buffer management logic can store the address of the entry of the TDU map memory 460 in a data field such as 706-1 of the PDU link descriptor for the PDU to which the second TDU belong. This completes the buffering or write operation for the second TDU received for the PDU.

The same or similar TDU buffering process can be repeated for additional TDUs of the PDU until all data fields of the PDU link descriptor 700 for storing or maintaining addresses of entries in the TDU memory map 460 are exhausted.

In response to receiving the third TDU for buffering, the buffer management logic can create a first link descriptor 800 for the PDU and stored the first cell link descriptor 800 at an entry of the DLDM 480 of FIG. 4. The entry of the DLDM 480 may be selected from presently free and available entries in the DLDM 480 and subsequently marked as no longer free or not available. The address of the entry in the DLDM 480 assigned to store the first cell link descriptor 800 may be stored in the first (cell link descriptor) address field 708-0 of the PDU link descriptor 700 created for the PDU for the purpose of referencing or linking additional TDUs/SDUs. The buffer management logic may partition or segment the third TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the third TDU. These SDU buffer entries can be determined as free or available based on the SDU entry free lists; assigned to the SDUs, respectively; subsequently marked as no longer free or not available in the SDU buffer 440. The actual copies of the SDUs that belong to the third TDU can be—for example, caused by the buffer management logic to be—stored or buffered in the SDU buffer entries assigned to the third TDU.

An address of a specific SDU entry such as the address of the very first SDU entry among the SDU entries respectively assigned to the SDUs of the third TDU can be stored or maintained in an entry of the TDU map memory 460. The entry of the TDU map memory 460 can be selected or determined as presently free or available using the TDU map memory free lists, assigned to the third TDU, and subsequently marked as not free or not available. The buffer management logic can store the address of the entry of the TDU map memory 460 in an address field 802-0 of the first cell link descriptor 800 of FIG. 8 created for the PDU. This completes the buffering or write operation for the third TDU received for the PDU.

The same or similar TDU buffering process can be repeated for additional TDUs of the PDU until all data fields 802-0 through 802-(N−1) of the first link descriptor 800 for storing or maintaining addresses of entries in the TDU map memory 460 are exhausted.

In response to receiving the (N+2)-th TDU for buffering, the buffer management logic can create a second link descriptor 800 for the PDU and stored the second cell link descriptor 800 at an entry of the DLDM 480 of FIG. 4. The entry of the DLDM 480 may be selected from presently free and available entries in the DLDM 480 and subsequently marked as no longer free or not available. The address of the entry in the DLDM 480 assigned to store the second cell link descriptor 800 may be stored in the second (cell link descriptor) address field 708-1 of the PDU link descriptor 700 created for the PDU for the purpose of referencing or linking additional TDUs/SDUs. The buffer management logic may partition or segment the (N+2)-th TDU into a (e.g., fixed, two, three, up to a maximum, etc.) number of SDUs and use the SDU entry free lists to locate the same number of SDU buffer entries in the SDU buffers 440 for storing or buffering actual copies of the SDUs that belong to the (N+2)-th TDU. These SDU buffer entries can be determined as free or available based on the SDU entry free lists; assigned to the SDUs, respectively; subsequently marked as no longer free or not available in the SDU buffer 440. The actual copies of the SDUs that belong to the (N+2)-th TDU can be—for example, caused by the buffer management logic to be—stored or buffered in the SDU buffer entries assigned to the (N+2)-th TDU.

An address of a specific SDU entry such as the address of the very first SDU entry among the SDU entries respectively assigned to the SDUs of the (N+2)-th TDU can be stored or maintained in an entry of the TDU map memory 460. The entry of the TDU map memory 460 can be selected or determined as presently free or available using the TDU map memory free lists, assigned to the (N+2)-th TDU, and subsequently marked as not free or not available. The buffer management logic can store the address of the entry of the TDU map memory 460 in an address field 802-0 of the second cell link descriptor 800 of FIG. 8 created for the PDU. This completes the buffering or write operation for the (N+2)-th TDU received for the PDU.

This or similar TDU buffering process can be repeated for additional TDUs of the PDU until all data fields 802-0 through 802-(N−1) of the second link descriptor 800 for storing or maintaining addresses of entries in the TDU map memory 460 are exhausted.

3.4. DLDM Bank or Sub Bank Selection

Link descriptors as described herein can be distributed over multiple banks or multiple sub banks in a single DLDM to support relatively fast (e.g., concurrent, reliable, etc.) read/write operations at relatively high bit rates associated with individual egress pipelines/ports/paths and/or with individual network devices.

As noted, a PLD for a PDU may be used to store a certain number of pointers (which may be referred to head pointers) or cell addresses for a certain number of (e.g., initial, etc.) SDUs or TDUs in the PDU. Additional pointers or cell addresses may be overflowed to or stored in one or more CLDs associated with or referenced by the PDU.

In some operational scenarios, PLDs for some or all PDUs may be stored in a physical memory of a first memory structure used to support relatively low latency memory access operations. CLDs associated with some or all of these PLDs may be stored in a separate physical memory of a second memory structure that is different from the first memory structure of the physical memory used to store the PLDs. The certain number of head pointers or cell addresses to be stored or referenced directly by a PDU may be selected based on a number of selection factors including but not limited to device densities, latency requirements, costs including fabrication and/or testing costs, or other factors relating to intended performance or operation of a network apparatus or system as described herein. For example, the certain number of head pointers or cell addresses referenced or stored directly in each PDU may be selected to reduce or avoid overflowing cell addresses—e.g., only ¼ of the total cell addresses, only ⅓ of the total cell addresses, etc.—to CLDs associated with the PDU. Hence, in many operational scenarios, distributed memory or memory structures may be used to host or store PLDs or CLDs as described herein.

Figure 11:
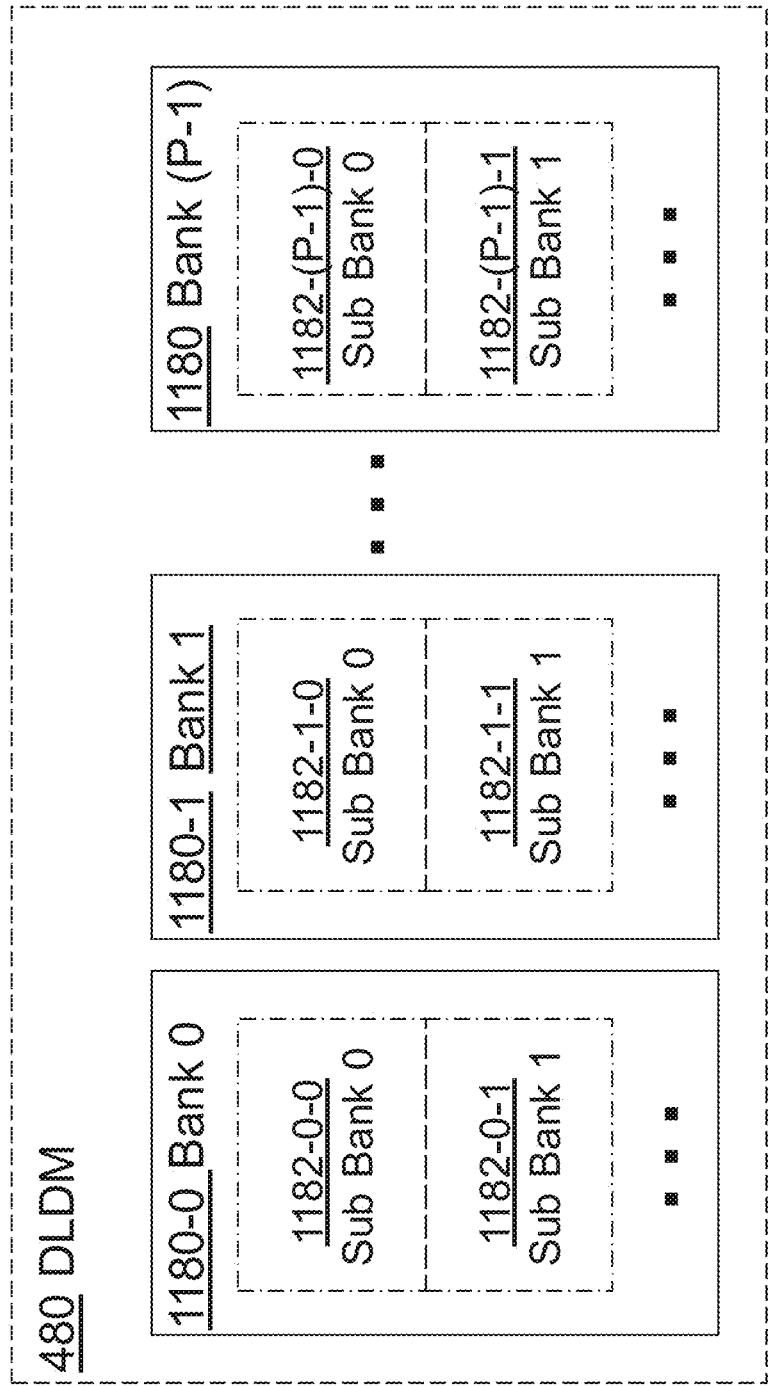
FIG. 11 illustrates an example distributed link descriptor memory (DLDM)

FIG. 11 illustrates an example DLDM 480. Read and/or write operations can be supported with PDU and/or cell link descriptors that are or will be stored in the DLDM 480. Read operations to any descriptor type (PLD or CLD) stored or maintained in a DLDM bank or a sub bank therein may be given priority over write operations for access to the same DLDM bank or sub bank.

The DLDM 480 may comprise one or more banks 1180-0 Bank 0 through 1180 Bank (P−1), where P is a positive integer no less than one (1). Each bank of the one or more banks of the DLDM 480 may comprise one or more DLDM sub banks. For example, the Bank 0 1180-0 may include Sub Bank 0 1182-0-0, Sub Bank 1 1182-0-1, etc. Similarly, the Bank 1 1180-1 may include Sub Bank 0 1182-1-0, Sub Bank 1 1182-1-1, etc. The Bank 1 1180-(P−1) may include Sub Bank 0 1182-(P−1)-0, Sub Bank 1 1182-(P−1)-1, etc.

In some operational scenarios, for write operations, a PLD for each incoming packet or PDU may be mapped to a DLDM bank (or a sub bank therein) that satisfies the following criteria: (i) the sub bank is not being used by a read operation; (ii) the sub bank is not being used by another write operation; and (iii) the sub bank was not used to store a previous PDU link descriptor for a previous PDU immediately preceding the incoming packet or PDU in the same packet or PDU egress queue to which both the previous PDU and the incoming PDU (or packet) belong.

This bank or sub bank selection for storing or writing the PLD (of each PDU) in the DLDM may precede any bank or sub bank selection(s) for storing or writing any CLD(s) referenced by pointers or addresses stored in the PLD. A CLD referenced by a pointer or address in the PDU may be mapped to a DLDM bank (or a sub bank therein) that satisfies the following criteria: (i) the bank is not being used by a read operation, and (ii) the bank is not being used by another write operation.

Figure 12:
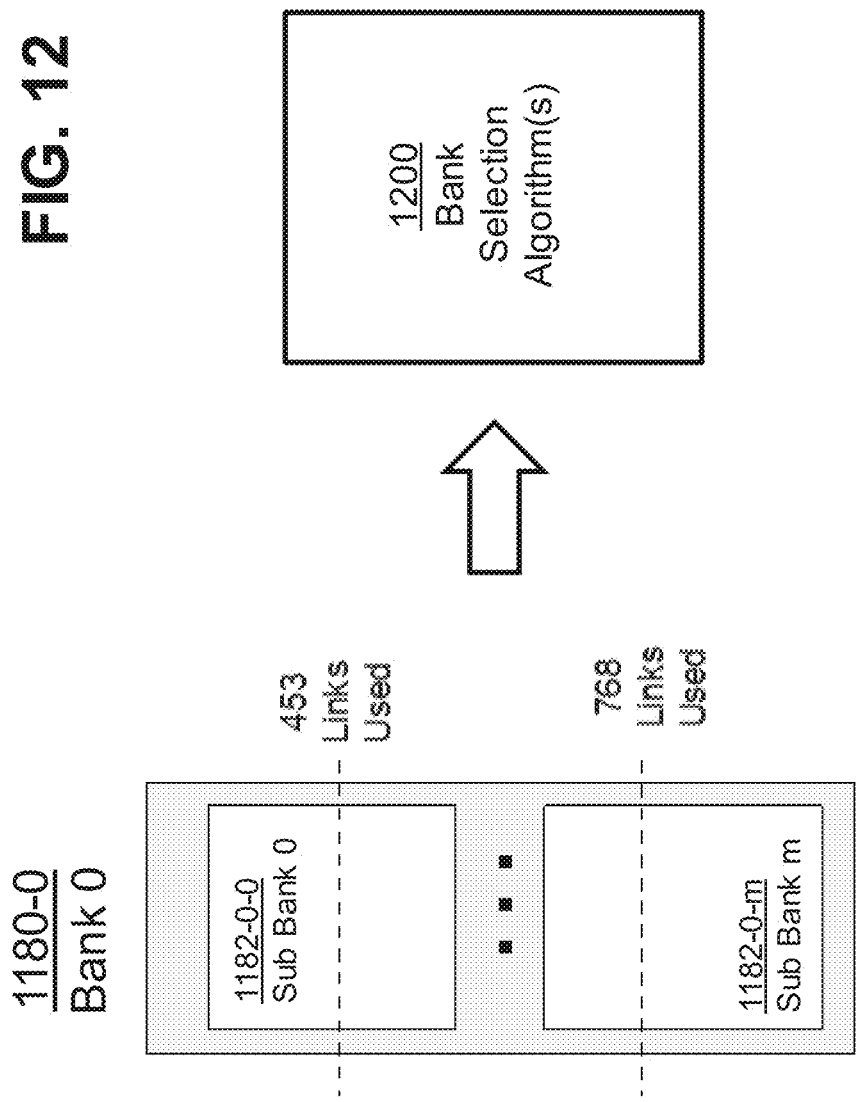
FIG. 12 illustrate example DLDM bank or sub bank selection.

FIG. 12 illustrate example bank or sub bank selection for a link descriptor such as a PLD. In some operational scenarios, fill levels of banks or sub banks in the DLDM may be determined or tracked. For example, for each sub bank in a DLDM bank such as Bank 0 1180-0, a fill level represented by the total number of entries each of which stores or is occupied by a (valid) PLD or CLD is tracked. For the purpose of illustration only, the total number of entries each of which stores or is occupied by a (valid) PLD or CLD in Sub Bank 0 1182-0-0 of the Bank 0 1180-0 may be 453, whereas the total number of entries each of which stores or is occupied by a (valid) PLD or CLD in Sub Bank m 1182-0-*m* of the Bank 0 1180-0 may be 768.

A fill level of a DLDM bank may be computed or derived as a group value of fill level(s) represented by all the total numbers of entries occupied by (valid) PLDs or CLDs in all the sub banks of the DLDM bank. In an example, the highest or maximum number among all the total numbers may be used to represent the fill level of the DLDM bank. In another example, the sum of all the total numbers may be used to represent the fill level of the DLDM bank. In yet another example, the average or another group value of all the total numbers may be used to represent the fill level of the DLDM bank.

In response to receiving a request for storing a PLD for an incoming packet or PDU, fill levels of DLDM bank(s) and/or sub banks therein may be used as input by one or more bank selection algorithm(s) 1200 to identify a specific DLDM bank or a specific sub bank therein to store or maintain the PLD.

In an example, one of the one or more algorithm(s) may be a least fill first selection algorithm that compares all fill levels of some or all banks or sub banks in the DLDM 480 and selects a specific bank or sub bank with the least in the fill levels. In another example, one of the one or more algorithm(s) may be a round robin algorithm that orders banks or sub banks in the DLDM 480, successively selects a specific bank by starting from the very first bank or sub bank until the last bank or sub bank; and looped back to the very first bank or sub bank after the last bank or sub bank. In yet another example, one of the one or more algorithm(s) may be an adaptive band or sub bank selection algorithm that adopts different selection algorithms based on different fill levels of the DLDM. For example, when the DLDM or banks/sub banks therein are in a first fill level range such as a relatively low fill level range, a first bank or sub bank selection algorithm such as a round robin algorithm is used by the adaptive algorithm to distribute evenly across different banks or sub banks, and when the DLDM or banks/sub banks therein are in a second different fill level range such as a relatively high fill level range, a second different bank or sub bank selection algorithm such as a least fill first algorithm is used by the adaptive algorithm to prevent overloading in any of the banks or sub banks.

4.0. Example Embodiments

FIG. 14 illustrates an example process flow, according to an embodiment. The various elements of the flow described below may be performed by a network device implemented with one or more computing devices. The network device can store or maintain packet and cell linking data in a distributed link descriptor memory ("DLDM") including a plurality of memory instances each of which, when used, stores a protocol data unit ("PDU") link descriptor ("PLD") or a cell link descriptor ("CLD").

In block 1402, responsive to receiving a request for buffering a current transfer data unit ("TDU") in a sequence of TDUs that belong to a current PDU, a buffer manager in the network device, accesses a current PLD, for the current PDU, in a first memory instance in the plurality of memory instances of the DLDM.

In block 1404, the buffer manager determines whether any data field designated to store address information in connection with a TDU is currently unoccupied within the current PLD.

In block 1406, responsive to determining that no data field designated to store address information in connection with a TDU is currently unoccupied within the current PLD, the buffer manager accesses a current CLD in a second memory instance in the plurality of memory instances of the same DLDM.

In block 1408, the buffer manager stores current address information in connection with the current TDU in an address data field within the current CLD.

In an embodiment, the current PLD includes one or more data fields designated to store pointers to one or more CLDs; one of the one or more data fields is populated with a pointer to the current CLD in the DLDM.

In an embodiment, the DLDM is partitioned into one or more banks each of which includes a respective subset of memory instances in the plurality of memory instances; the first and second memory instances are two different memory instances in a specific bank of the DLDM.

In an embodiment, the specific bank is selected from among the one or more banks of the DLDM based on one or more of: a least fill first selection algorithm, a round-robin algorithm, or another bank selection algorithm.

In an embodiment, the current PLD includes a specific number of data fields designated to store address information of up to the same specific number of TDUs in the current PDU.

In an embodiment, the current CLD includes a specific number of data fields designated to store address information of up to the same specific number of TDUs in the current PDU.

In an embodiment, the current PLD includes a specific number of data fields designated to store up to the same specific number of pointers to up to the same specific number of CLDs for the current PDU.

In an embodiment, the current PLD is stored in a first memory bank of the DLDM; the current CLD is stored in a second memory bank, different from the first memory bank, of the DLDM.

In an embodiment, the current PDU belongs to a sequence of PDUs to be sent out through a specific egress packet pipeline; the current PLD for the current PDU includes a pointer to a next PLD for a next PDU in the sequence of PDUs.

In an embodiment, the current TDU is divided into two or more storage data units ("SDUs"); the current address information in connection with the current TDU is represented by an address of a specific SDU in the two or more SDUs that belong to the current TDU.

In an embodiment, the current TDU is divided into two or more storage data units ("SDUs"); an address of a specific SDU in the one or more SDUs that belong to the current TDU is stored in an entry in a TDU map memory; the current address information in connection with the current TDU is represented by a pointer to the entry in the TDU map memory.

In an embodiment, a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

5.0. Implementation Mechanism-Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 13:
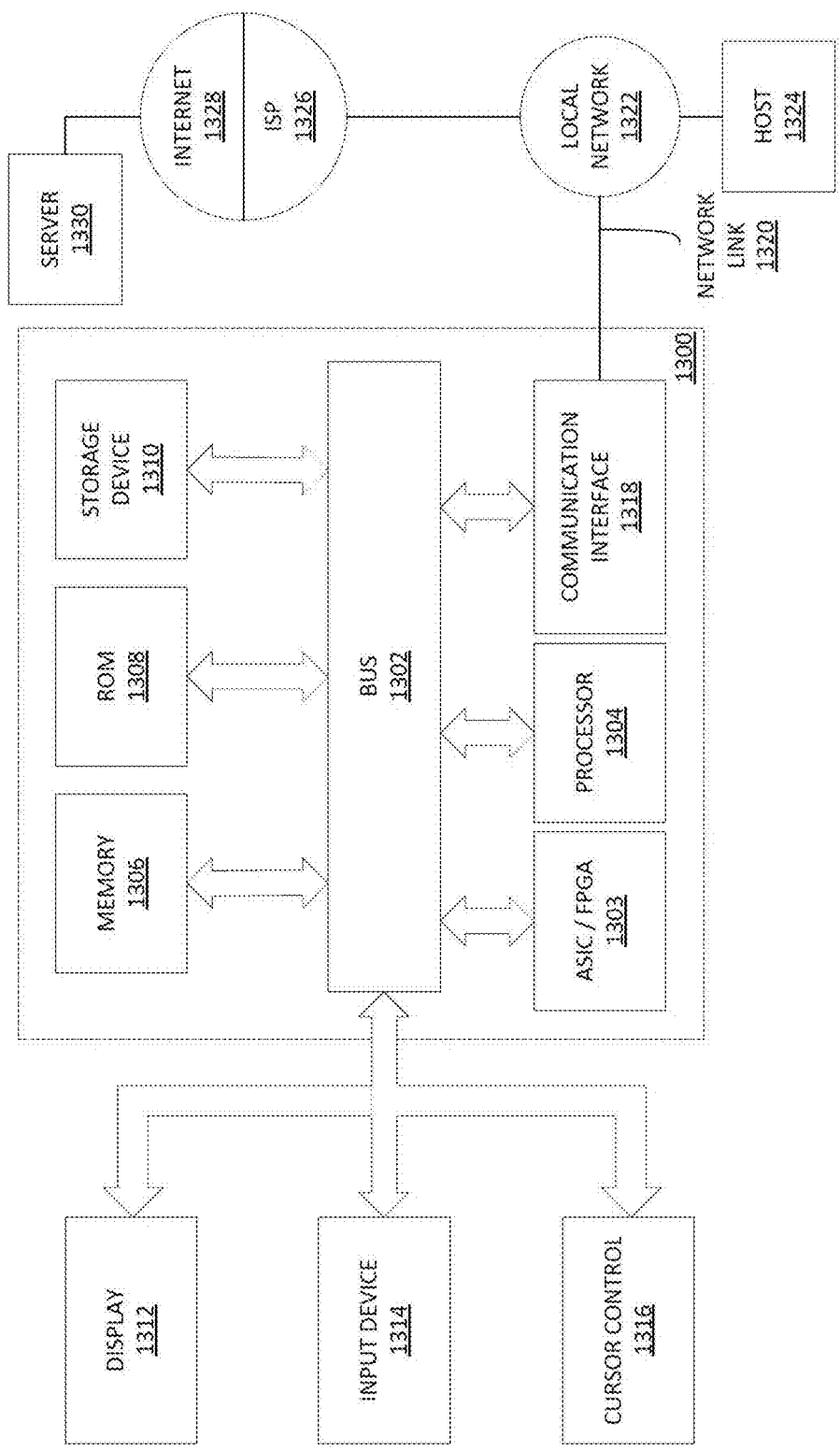
FIG. 13 is block diagram of an example computer system upon which embodiments of the inventive subject matter may be implemented.

FIG. 13 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 13 constitutes a different view of the devices and systems described in previous sections.

Computer system 1300 may include one or more ASICs, FPGAs, or other specialized circuitry 1303 for implementing program logic as described herein. For example, circuitry 1303 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1300 may include one or more hardware processors 1304 configured to execute software-based instructions. Computer system 1300 may also include one or more busses 1302 or other communication mechanism for communicating information. Busses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes one or more memories 1306, such as a RAM, hardware registers, or other dynamic or volatile storage device for storing data units to be processed by the one or more ASICs, FPGAs, or other specialized circuitry 1303. Memory 1306 may also or instead be used for storing information and instructions to be executed by processor 1304. Memory 1306 may be directly connected or embedded within circuitry 1303 or a processor 1304. Or, memory 1306 may be coupled to and accessed via bus 1302. Memory 1306 also may be used for storing temporary variables, data units describing rules or policies, or other intermediate information during execution of program logic or instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, may optionally be provided and coupled to bus 1302 for storing information and instructions.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as an 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send and receive data units through the network(s), network link 1320, and communication interface 1318. In some embodiments, this data may be data units that the computer system 1300 has been asked to process and, if necessary, redirect to other computer systems via a suitable network link 1320. In other embodiments, this data may be instructions for implementing various processes related to the described techniques. For instance, in the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

Computer system 1300 may optionally be coupled via bus 1302 to one or more displays 1312 for presenting information to a computer user. For instance, computer system 1300 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are optionally coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

As discussed, computer system 1300 may implement techniques described herein using customized hard-wired logic, one or more ASICs or FPGAs 1303, firmware and/or program logic, which in combination with the computer system causes or programs computer system 1300 to be a special-purpose machine. According to one embodiment, however, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
a distributed link descriptor memory ("DLDM") including a plurality of memory instances each of which, when used, stores a protocol data unit ("PDU") link descriptor ("PLD") or a cell link descriptor ("CLD");
buffer management logic that performs:
responsive to receiving a request for buffering a current transfer data unit ("TDU") in a sequence of TDUs that belong to a current PDU, accessing a current PLD, for the current PDU, in a first memory instance in the plurality of memory instances of the DLDM;
determining whether any data field designated to store address information in connection with a TDU is currently unoccupied within the current PLD;
responsive to determining that no data field designated to store address information in connection with a TDU is currently unoccupied within the current PLD, performing:
accessing a current CLD in a second memory instance in the plurality of memory instances of the same DLDM;
storing current address information in connection with the current TDU in an address data field within the current CLD.

2. The network apparatus of claim 1, wherein the current PLD includes one or more data fields designated to store pointers to one or more CLDs; wherein one of the one or more data fields is populated with a pointer to the current CLD in the DLDM.

3. The network apparatus of claim 1, wherein the DLDM is partitioned into one or more banks each of which includes a respective subset of memory instances in the plurality of memory instances; wherein the first and second memory instances are two different memory instances in a specific bank of the DLDM.

4. The network apparatus of claim 3, wherein the specific bank is selected from among the one or more banks of the DLDM based on one or more of: a least fill first selection algorithm, a round-robin algorithm, or another bank selection algorithm.

5. The network apparatus of claim 1, wherein the current PLD includes a specific number of data fields designated to store address information of up to the same specific number of TDUs in the current PDU.

6. The network apparatus of claim 1, wherein the current CLD includes a specific number of data fields designated to store address information of up to the same specific number of TDUs in the current PDU.

7. The network apparatus of claim 1, wherein the current PLD includes a specific number of data fields designated to store up to the same specific number of pointers to up to the same specific number of CLDs for the current PDU.

8. The network apparatus of claim 1, wherein PLDs including the current PLD are stored in a first physical memory; wherein CLDs including the current CLD are stored in a second physical memory bank, different from the first physical memory.

9. The network apparatus of claim 1, wherein the current PDU belongs to a sequence of PDUs to be sent out through a specific egress packet pipeline; wherein the current PLD for the current PDU includes a pointer to a next PLD for a next PDU in the sequence of PDUs.

10. The network apparatus of claim 1, wherein the current TDU is divided into two or more storage data units ("SDUs"); wherein the current address information in connection with the current TDU is represented by an address of a specific SDU in the two or more SDUs that belong to the current TDU.

11. The network apparatus of claim 1, wherein the current TDU is divided into two or more storage data units ("SDUs"); wherein an address of a specific SDU in the one or more SDUs that belong to the current TDU is stored in an entry in a TDU map memory; wherein the current address information in connection with the current TDU is represented by a pointer to the entry in the TDU map memory.

12. A method comprising:
storing data in a distributed link descriptor memory ("DLDM") including a plurality of memory instances each of which, when used, stores a protocol data unit ("PDU") link descriptor ("PLD") or a cell link descriptor ("CLD");
responsive to receiving a request for buffering a current transfer data unit ("TDU") in a sequence of TDUs that belong to a current PDU, accessing a current PLD, for the current PDU, in a first memory instance in the plurality of memory instances of the DLDM;
determining whether any data field designated to store address information in connection with a TDU is currently unoccupied within the current PLD;
responsive to determining that no data field designated to store address information in connection with a TDU is currently unoccupied within the current PLD, performing:
accessing a current CLD in a second memory instance in the plurality of memory instances of the same DLDM;
storing current address information in connection with the current TDU in an address data field within the current CLD.

13. The method of claim 12, wherein the DLDM is partitioned into one or more banks each of which includes a respective subset of memory instances in the plurality of memory instances; wherein the first and second memory instances are two different memory instances in a specific bank of the DLDM.

14. The method of claim 13, wherein the specific bank is selected from among the one or more banks of the DLDM based on one or more of: a least fill first selection algorithm, a round-robin algorithm, or another bank selection algorithm.

15. The method of claim 12, wherein the current PLD includes a specific number of data fields designated to store address information of up to the same specific number of TDUs in the current PDU.

16. The method of claim 12, wherein the current CLD includes a specific number of data fields designated to store address information of up to the same specific number of TDUs in the current PDU.

17. The method of claim 12, wherein the current PLD includes a specific number of data fields designated to store up to the same specific number of pointers to up to the same specific number of CLDs for the current PDU.

18. One or more non-transitory computer readable media storing instructions that, when executed by one or more computing devices, cause performance of:

storing data in a distributed link descriptor memory ("DLDM") including a plurality of memory instances each of which, when used, stores a protocol data unit ("PDU") link descriptor ("PLD") or a cell link descriptor ("CLD");

responsive to receiving a request for buffering a current transfer data unit ("TDU") in a sequence of TDUs that belong to a current PDU, accessing a current PLD, for the current PDU, in a first memory instance in the plurality of memory instances of the DLDM;

determining whether any data field designated to store address information in connection with a TDU is currently unoccupied within the current PLD;

responsive to determining that no data field designated to store address information in connection with a TDU is currently unoccupied within the current PLD, performing:

accessing a current CLD in a second memory instance in the plurality of memory instances of the same DLDM;

storing current address information in connection with the current TDU in an address data field within the current CLD.

19. The one or more non-transitory computer readable media of claim 18, wherein the DLDM is partitioned into one or more banks each of which includes a respective subset of memory instances in the plurality of memory instances; wherein the first and second memory instances are two different memory instances in a specific bank of the DLDM.

20. The method of claim 12, wherein the current PLD includes one or more data fields designated to store pointers to one or more CLDs; wherein one of the one or more data fields is populated with a pointer to the current CLD in the DLDM.

* * * * *